United States Patent
Bouché et al.

(10) Patent No.: US 12,523,394 B2
(45) Date of Patent: *Jan. 13, 2026

(54) SOUND REDUCTION VENTILATION ASSEMBLY

(71) Applicant: Broan-NuTone LLC, Hartford, WI (US)

(72) Inventors: Patrick Bouché, Sherbrooke (CA); Raymond Panneton, Sherbrooke (CA); Brent Lillesand, Milwaukee, WI (US); Jean-Bernard Piaud, Drummondville (CA); Rick Sinur, Hartford, WI (US); Santosh Narasimhan, Port Washington, WI (US); Marco Lizotte, Saint-Louis-de-Blandford (CA)

(73) Assignee: Broan-NuTone LLC, Hartford, WI (US)

( * ) Notice: Subject to any disclaimer, the term of this patent is extended or adjusted under 35 U.S.C. 154(b) by 205 days.

This patent is subject to a terminal disclaimer.

(21) Appl. No.: 18/330,615

(22) Filed: Jun. 7, 2023

(65) Prior Publication Data

US 2023/0358437 A1  Nov. 9, 2023

Related U.S. Application Data

(63) Continuation-in-part of application No. 17/737,153, filed on May 5, 2022, now Pat. No. 11,680,731.
(Continued)

(51) Int. Cl.
*F24F 13/24* (2006.01)
*G10K 11/162* (2006.01)

(52) U.S. Cl.
CPC ............ *F24F 13/24* (2013.01); *G10K 11/162* (2013.01); *F24F 2013/242* (2013.01)

(58) Field of Classification Search
CPC ... F24F 13/24; F24F 2013/242; G10K 11/162
(Continued)

(56) References Cited

U.S. PATENT DOCUMENTS

| 6,023,938 A | 2/2000 | Taras et al. |
| 6,217,281 B1 * | 4/2001 | Jeng ..................... F04D 29/703 |
| | | 415/119 |

(Continued)

FOREIGN PATENT DOCUMENTS

| CN | 105765139 | 7/2016 |
| GB | 2510900 | 8/2014 |
| JP | WO2005073640 | 8/2005 |

OTHER PUBLICATIONS

"Design of radial sonic crystal for sound attenuation from divergent sound source," Gupta, et al., Elsevier—Wave Motion 55 (2015) (9 pages).
(Continued)

*Primary Examiner* — Forrest M Phillips
(74) *Attorney, Agent, or Firm* — Hansen Reynolds LLC

(57) ABSTRACT

A ventilation assembly and methods of forming the same includes a ventilation grille having reducing acoustic bodies configured to attenuate sound of the ventilation assembly. Arrangement of the acoustic bodies can form phononic crystal to attenuate sound and can be tuned to desired sound bands to reduce sounds.

20 Claims, 22 Drawing Sheets

Related U.S. Application Data which is a continuation of application No. 16/553,456, filed on Aug. 28, 2019, now Pat. No. 11,353,239.

(58) Field of Classification Search
USPC .......................................................... 181/224
See application file for complete search history.

(56) References Cited

U.S. PATENT DOCUMENTS

| | | | |
|---|---|---|---|
| 8,123,468 | B2 | 2/2012 | Shirahama et al. |
| 8,146,707 | B2 | 4/2012 | Choi et al. |
| 9,305,539 | B2 | 4/2016 | Lind et al. |
| 9,441,642 | B2 | 9/2016 | Rao et al. |
| 9,641,043 | B1 | 5/2017 | Leedy |
| 10,087,954 | B2 | 10/2018 | Wang |
| 10,323,655 | B2* | 6/2019 | Arima ................. F04D 25/0613 |
| 11,204,204 | B2* | 12/2021 | Lee ......................... F01N 1/023 |
| 11,353,239 | B2* | 6/2022 | Bouche ............... G10K 11/162 |
| 11,680,731 | B2* | 6/2023 | Bouche .................. F24F 7/007 181/224 |
| 2005/0045416 | A1 | 3/2005 | McCarty |
| 2010/0175411 | A1* | 7/2010 | Choi ..................... F24F 1/0047 62/426 |
| 2017/0030595 | A1* | 2/2017 | Choi ..................... F24F 1/0014 |
| 2022/0018552 | A1 | 1/2022 | Karamanos et al. |
| 2022/0373224 | A1 | 11/2022 | Naber |

OTHER PUBLICATIONS

"Acoustic resonances in two-dimensional radial sonic crystal shells," Torrent et al., New Journal of Physics, Jul. 27, 2010 (20 pages).

"Radial Wave Crystals: Radially Periodic Structures from Anisotropic Metamaterials for Engineering Acoustic or Electromagnetic Waves," Torrent et al., Physical Review Letters, Aug. 7, 2009 (5 pages).

Canadian Application No. 3,089,633, Office Action mailed Mar. 21, 2024 (4 pages).

* cited by examiner

SOUND REDUCTION VENTILATION ASSEMBLY

CROSS-REFERENCE TO RELATED APPLICATIONS

This application is a continuation-in-part of U.S. application Ser. No. 17/737,153, filed on May 5, 2022, which is a continuation of U.S. application Ser. No. 16/553,456, filed on Aug. 28, 2019, each of which is incorporated in its entirety herein by reference and made a part hereof.

TECHNICAL FIELD

The present disclosure relates to devices, systems, and methods for sound reducing grilles. More particularly, but not exclusively, the present disclosure relates to devices, systems, and methods for grilles for use in ventilation of enclosed rooms.

BACKGROUND

Ventilation is commonly applied to maintain desirable air conditions within confined spaces. For example, common households may include ventilation devices and/or systems for rooms having sinks or bath fixtures that use water to remove excess humidity, noxious odors or other pollutants from the room. Ventilation can require moving parts to draw air which can create vibrations and/or sound, yet, reducing excess vibration and/or sound can require costly upgrades to component parts. Accordingly, there is a need for improved ventilation with reduced vibrations and/or sound.

SUMMARY

In accordance with an aspect of the present disclosure, a ventilation assembly may comprise a main housing defining an inlet through which air can be received into the main housing and an outlet through which air can exit the main housing, a blower situated in the main housing and operable to generate a flow of air, and a grille comprising phononic crystals configured to be located adjacent to the main housing inlet.

A ventilation assembly is disclosed comprising a main housing defining an inlet through which air can be received into the main housing and defining an outlet; a blower in the main housing and operable to generate a flow of air; and a grille configured to be located adjacent to the main housing inlet, the grille having a means for reducing sound. The means for reducing sound can comprise a plurality of acoustic fixtures arranged about a grille outlet aperture defined in the grille. Adjacent acoustic fixtures can define air flow pathways in fluid communication with the grille outlet aperture. Each of the acoustic fixtures can comprise two or more acoustic bodies radially spaced apart from each other. The outer perimeter of each of the acoustic bodies can define smooth aerodynamic shape. The outer perimeter of each of the acoustic bodies can define a radial length, and each of the acoustic bodies of at least one of the acoustic fixtures can have equal radial length. The acoustic bodies of each acoustic fixture can comprise an outer acoustic body and an inner acoustic body. The outer acoustic bodies can be arranged annularly about the grille outlet aperture. The inner acoustic bodies can be arranged annularly about the grille outlet aperture. The inner and outer acoustic bodies of each acoustic fixture can be arranged with corresponding circumferential position about the grille outlet aperture. The grille can comprise a first plate defining the grille outlet aperture and the plurality of acoustic fixtures can extend from the first plate. The acoustic fixtures can each include at least two acoustic bodies situated to form a phononic crystal to attenuate sound. The phononic crystals can be collectively configured to attenuate sound within the frequency bands of the ventilation assembly. The phononic crystals can collectively be configured to attenuate sound within the frequency bands within the range of 160 to 6,300 Hz ⅓ octave band center. The phononic crystals can collectively be configured to attenuate sound within one or more frequency bands within the range of 160 to 6,300 Hz. The phononic crystals can collectively be configured to attenuate sound within one or more frequency bands within the range of 20 Hz to 20 kHz.

Another ventilation assembly is disclosed comprising a main housing defining an inlet through which air can be received into the main housing and defining an outlet; a blower situated in the main housing and operable to generate a flow of air; and a grille configured to be located adjacent to the inlet of the main housing, the grille comprising a first plate defining a grille outlet aperture; a second plate spaced from the first plate; a plurality of acoustic bodies arranged about the grille outlet aperture, each acoustic body extending from one of the first plate and the second plate. The acoustic bodies can form at least one acoustic fixture. At least one of the acoustic bodies can extend between the first and second plate. At least one of the acoustic bodies can extend between the first and second plate and connect to both the first and second plate. Adjacent acoustic bodies can define air flow pathways in fluid communication with the grille outlet aperture. The acoustic bodies can comprise two or more acoustic bodies radially spaced apart from each other. The outer perimeter of each of the acoustic bodies can define a radial length, and each of the acoustic bodies of at least one of the acoustic fixtures can have equal radial length. The acoustic bodies can comprise a plurality of outer acoustic bodies and a plurality of inner acoustic bodies. The outer acoustic bodies can be arranged annularly about the grille outlet aperture. The inner acoustic bodies can be arranged annularly about the grille outlet aperture. The outer acoustic bodies and the inner acoustic bodies can define at least one phononic crystal to attenuate sound. The phononic crystals can collectively be configured to attenuate sound within the frequency bands of the ventilation assembly. At least one of the plurality of acoustic bodies can approximate an ellipse.

A ventilation grille is disclosed comprising a first plate defining a grille outlet aperture; and a plurality of acoustic fixtures extending from the first plate and arranged about the grille outlet aperture, each of acoustic fixtures comprising at least two acoustic bodies defining at least one phononic crystal to attenuate sound.

The foregoing and other features of the present disclosure will become more apparent upon reading of the following non-restrictive description of examples of implementation thereof, given by way of illustration only with reference to the accompanying drawings.

BRIEF DESCRIPTION OF THE DRAWINGS

In the appended drawings, where like reference numerals denote like elements throughout and in where.

DETAILED DESCRIPTION

Ventilation assemblies, such as ventilation fan assemblies, are often used to ventilate rooms (e.g. bathrooms and kitchens) in residential, commercial, and industrial structures. Bathroom ventilation fan assemblies are often installed in a cutout or cavity formed in a support member, such as bathroom ceiling or wall. Traditional ventilation fan assemblies may include grilles or other air inlet openings through which the fan can draw air from the room while obstructing direct view of the fan assembly.

Figure 1:
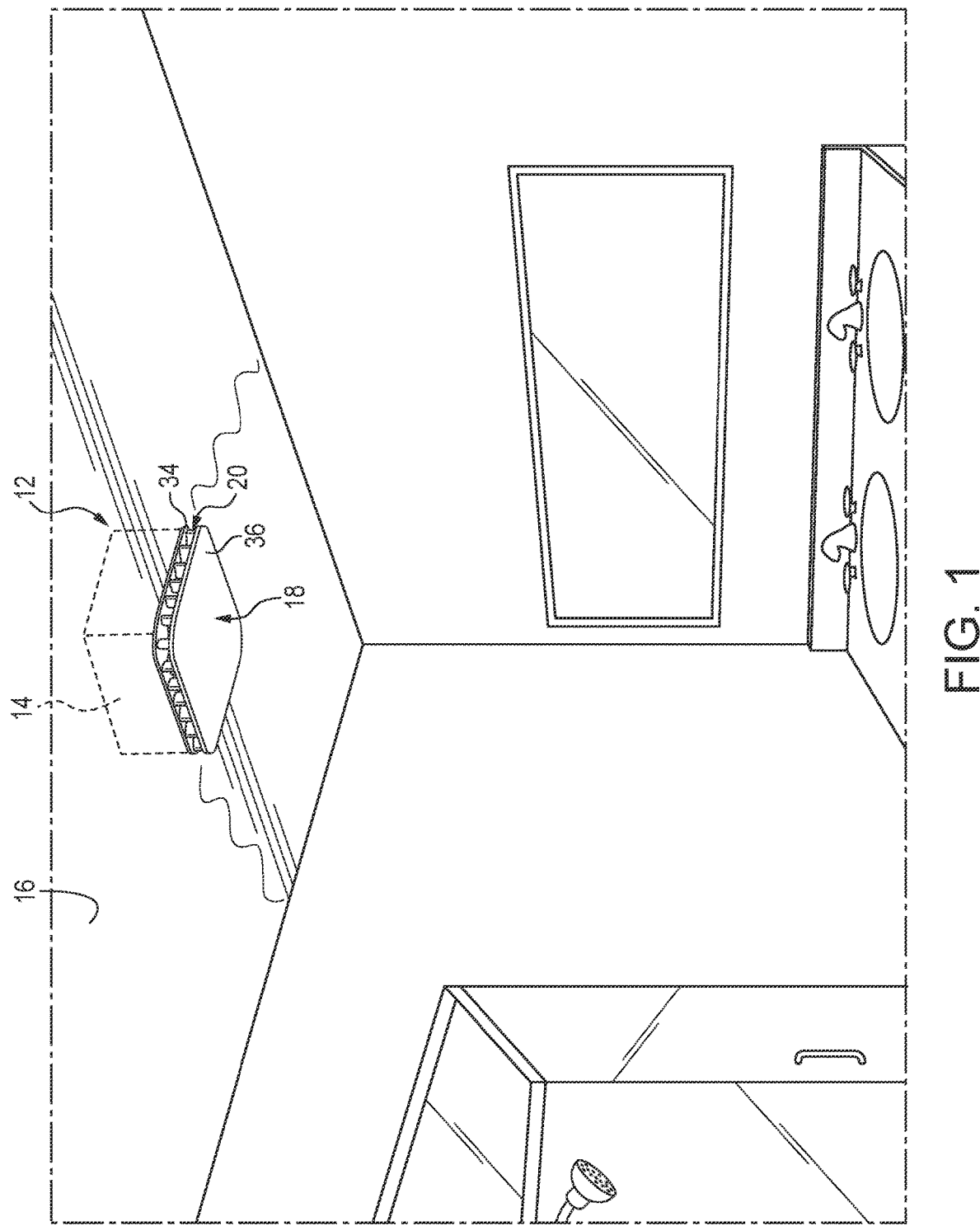
FIG. 1 is a perspective view of a non-restrictive illustrative embodiment of a ventilation assembly consistent with the present disclosure showing the ventilation assembly installed within a bathroom.

Referring to FIG. 1, an illustrative ventilation assembly 12 is shown installed within the ceiling of a bathroom. The ventilation assembly 12 includes a main housing 14 (as indicated in broken line in FIG. 1) located above the surface 16 of the ceiling and grille 18 for receiving air from the room, the grille 18 shown positioned in close proximity with the surface 16 of the ceiling and adjacent to an inlet 28 defined by the main housing 14. As discussed in additional detail below, the grille 18 include acoustic bodies 40 which can reduce the sound resulting from operation of the ventilation assembly 12.

Figure 2:
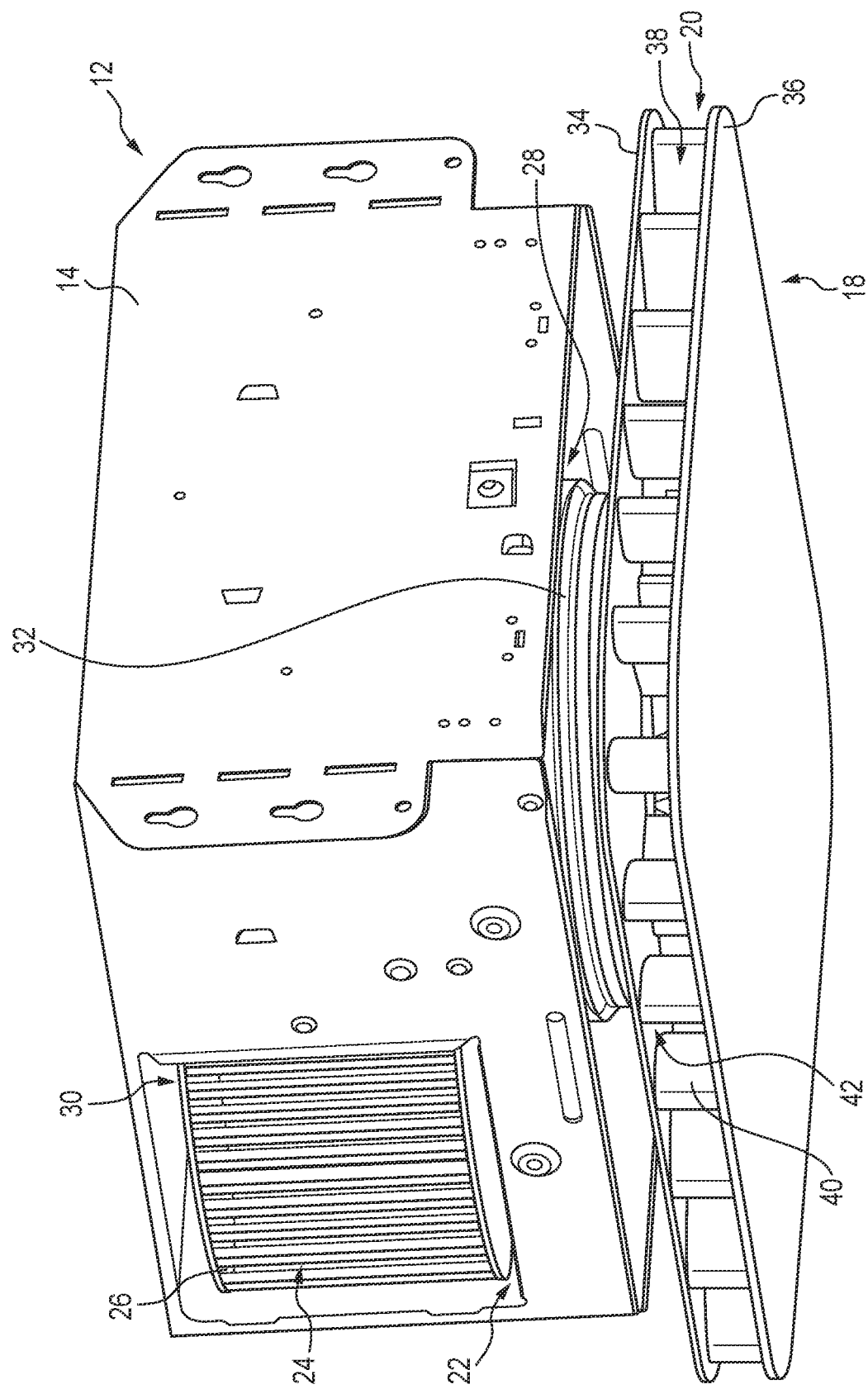
FIG. 2 is perspective view of the ventilation assembly of FIG. 1 in isolation.

Referring now to FIG. 2, the main housing 14 defines an inner cavity 22 which houses a blower assembly 24. The blower assembly 24 includes a fan 26 operable by a motor to draw air from the adjacent room through the grille 18, through the inlet 28 (via the optional adaptor ring 32 discussed below) into the inner cavity 22 of the main housing 14 and out through an exhaust 30. The main housing 14 is illustratively shown as a square box, but in some embodiments may have any suitable arrangement including any suitable shape and/or size.

The grille 18 is illustratively arranged adjacent the inlet 28 of the main housing 14. The grille 18 is depicted as arranged in fluid communication with the inner cavity 22 via an optional flexible adaptor ring 32 to communicate air through from the room through the grille 18 and into the inner cavity 22 in an aerodynamically efficient manner. The main housing inlet 28 is depicted as an entire rectangular side of the main housing 14, but could alternatively be only an aperture the size and shape of the flexible adaptor ring 32. The grille 18 illustratively comprises a top plate 34 and bottom plate 36, and means for reducing sound 20 arranged between the plates 34, 36 to attenuate sound. As discussed in additional detail herein, as air flows through the grille 18, the means for reducing sound 20 can attenuate sound created by operation of the ventilation assembly 12.

Figure 3:
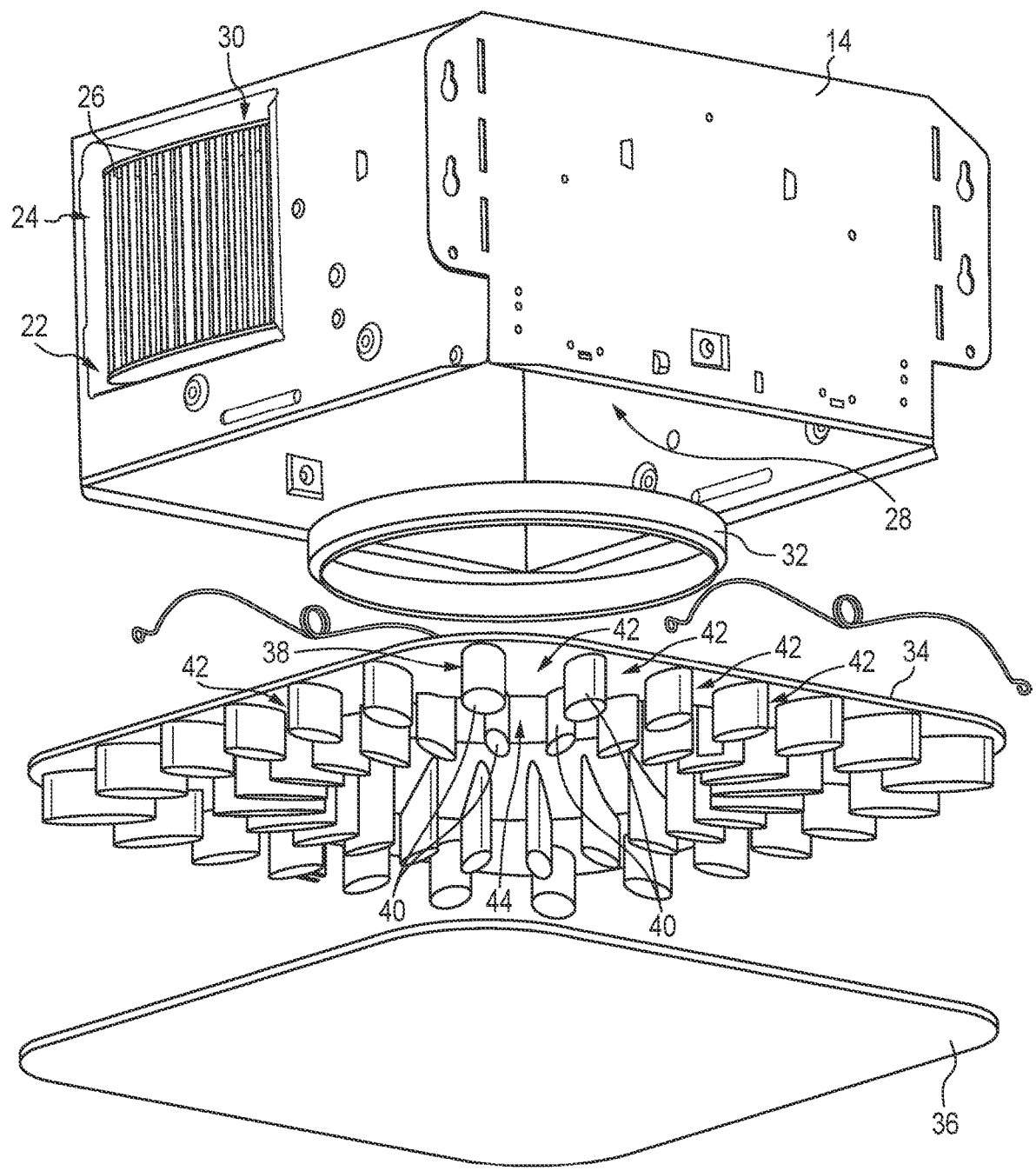
FIG. 3 is an exploded perspective view of the ventilation assembly of FIG. 2.

Referring to FIG. 3, the means for reducing sound 20 comprises a number of acoustic features 38 arranged to attenuate sound. Each acoustic feature 38 comprises a set of acoustic bodies 40, each set of acoustic bodies 40, which each acoustic feature 38, are collectively arranged to form a phononic crystal to attenuate sound, as discussed in additional detail herein. Adjacent acoustic features 38 are spaced apart from each other to define an air flow pathway 42 therebetween, which is bounded by the top and bottom plates 34, 36, where present. Both plates 34, 36 are not, however, required in all embodiments. Air is received from the room through the grille 18 at the outer perimeters of the top and bottom plates 34, 36, then travels through the airflow pathways 42 and then out of the grille 18 through an outlet aperture 44 defined in the top plate 24 and into the main housing 14. As discussed above, the air may optionally travel through a flexible adaptor ring 32.

Figure 4:
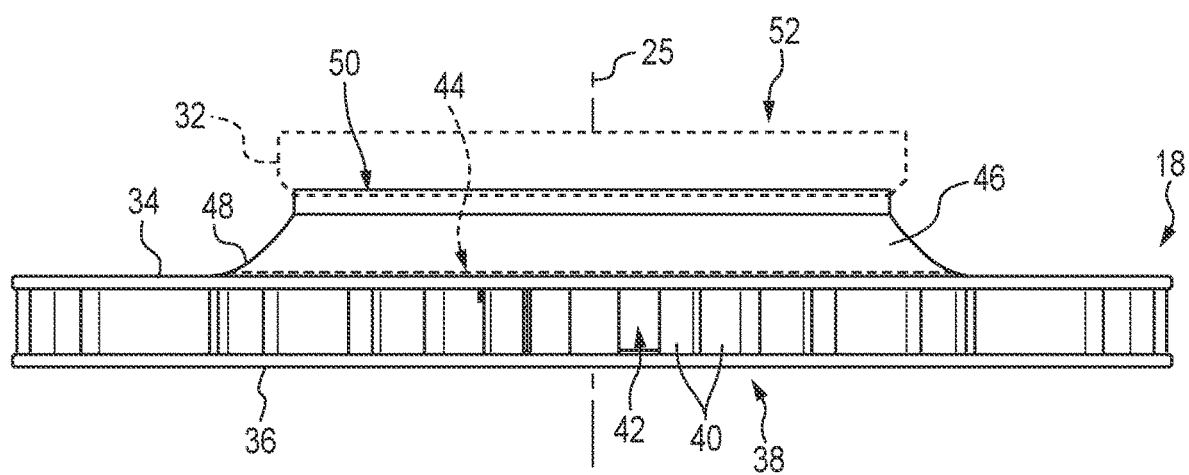
FIG. 4 is a side elevation view of the grille of the ventilation assembly of FIG. 2.
Figure 5:
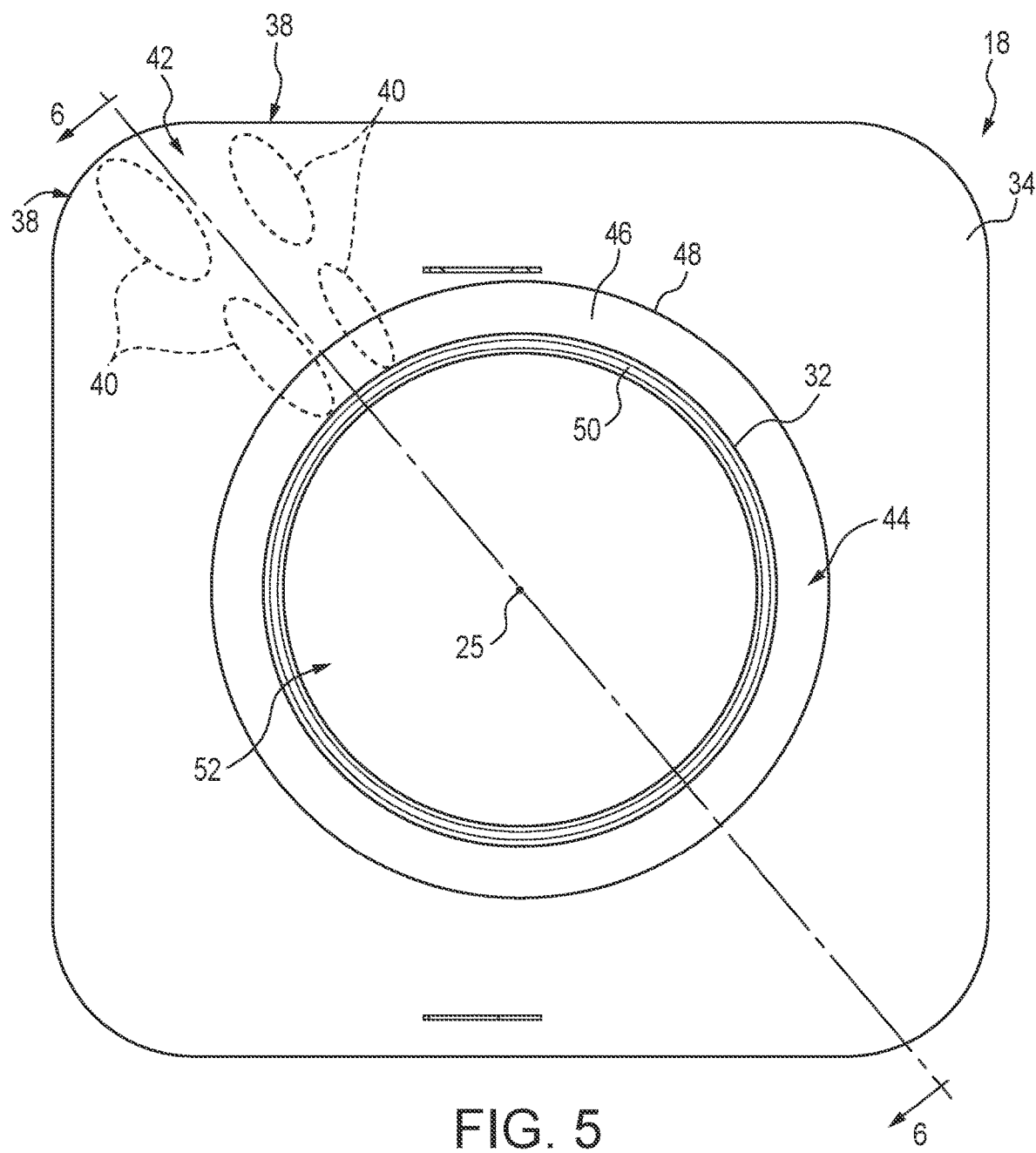
FIG. 5 is a top plan view of the grille of the ventilation assembly of FIG. 4 showing a first plate of the grille comprises an outlet aperture.

Referring now to FIGS. 4 and 5, the top plate 34 illustratively defines the outlet aperture 44. The grille 18 defines a collar 46 extending upwardly from the top plate 34 for connection with the adaptor ring 32 to fluidly communicate the outlet aperture 44 with the inner cavity 22 of the main housing 14. The collar 46 is illustratively formed hollow to communicate with the outlet aperture 44 on a first end 48 and with the adaptor ring 32 on the opposite, second end 50.

The collar 46 and the adaptor ring 32 collectively define a flow passage 52 communicating between the outlet aperture 44 and the adaptor ring 32.

Figure 6:
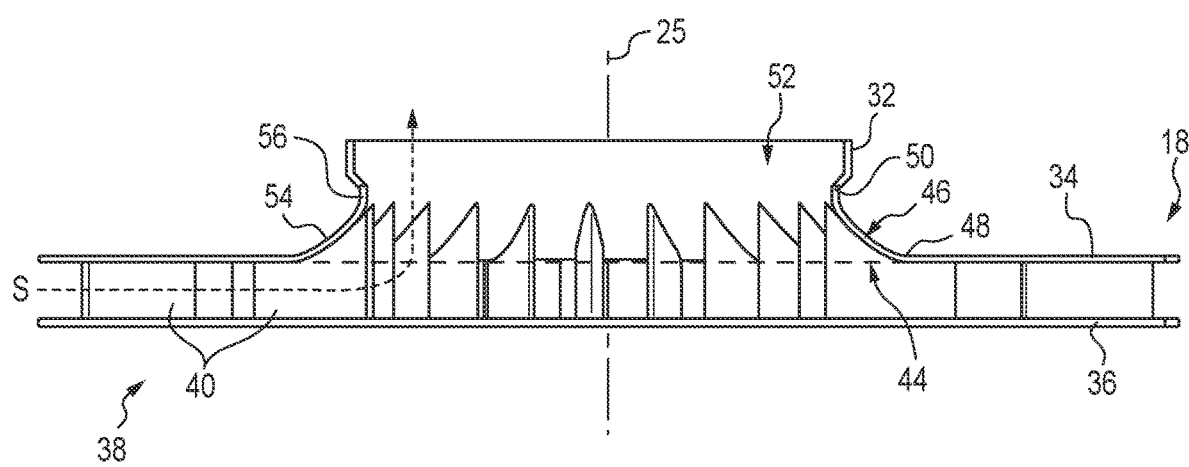
FIG. 6 is cross-sectional view of the grille of the ventilation assembly of FIG. 5 taken along the line 6F-6.

In FIG. 6, the collar 46 is illustratively formed to define a torus section 54 extending from the plate 34 at the collar first end 48 and a mating section 56 extending from the torus section 54 to define the second end 50 for engagement with the adaptor ring 32. The adaptor ring 32 can be separate from the collar 46 and secured thereto by any known means (e.g. force fit, adhesive, sonic weld, etc.) or the adaptor ring 32 can be integral with the collar 46.

The collar 46 defines a manifold transition section between the grille 18 and the ventilation assembly main housing 14 to provide smooth aerodynamic transition therebetween. In particular, the collar 46 extends from the top plate 34 toward the fan 26 to direct fluid flow toward the fan 46 and preventing fluid flow from greater access to the main housing inner cavity 22 which can redirect the fluid flow and/or create unwanted turbulence in the fluid flow, thereby lowering the efficiency of the ventilation assembly 12. Stated differently, the collar 46 directs the fluid flow from the top plate 34 toward the fan 24 in an aerodynamically efficient manner. The collar 46 can be configured so that the collar second end 50 approximately reaches the fan 24 upon installation. Alternatively, the collar second end can be spaced from the fan 24. The optional adaptor ring 32 can provide additional length to the collar 46 to lengthen the control of the fluid flow into the main housing 14 and toward the fan 24. In some embodiments, the collar second end 50 and/or the optional adaptor ring 32 can be sized to approximate the inlet of the fan 24 to deliver the fluid flow from the top plate 34 to the fan 24.

Figure 7:
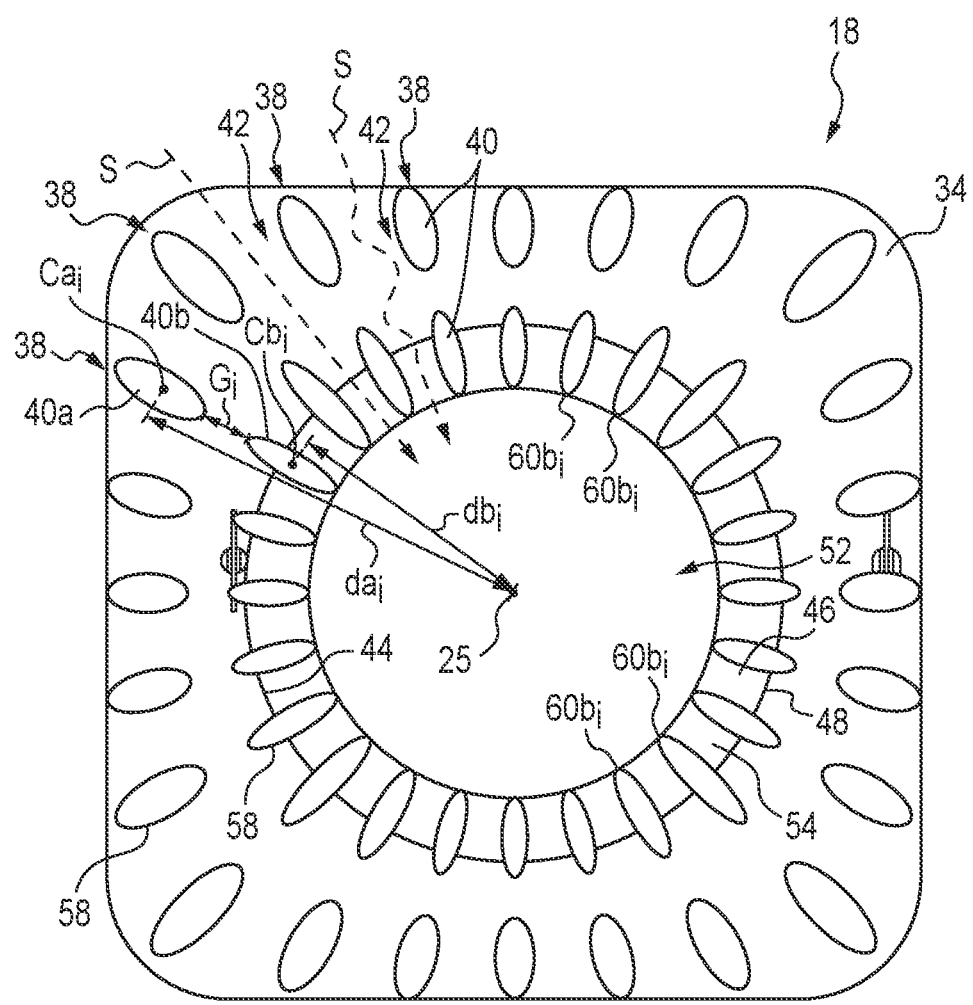
FIG. 7 is a bottom plan view of the first plate of the grille of the ventilation assembly of FIG. 5 showing a plurality of acoustic bodies arranged annularly around the outlet aperture.
Figure 8:
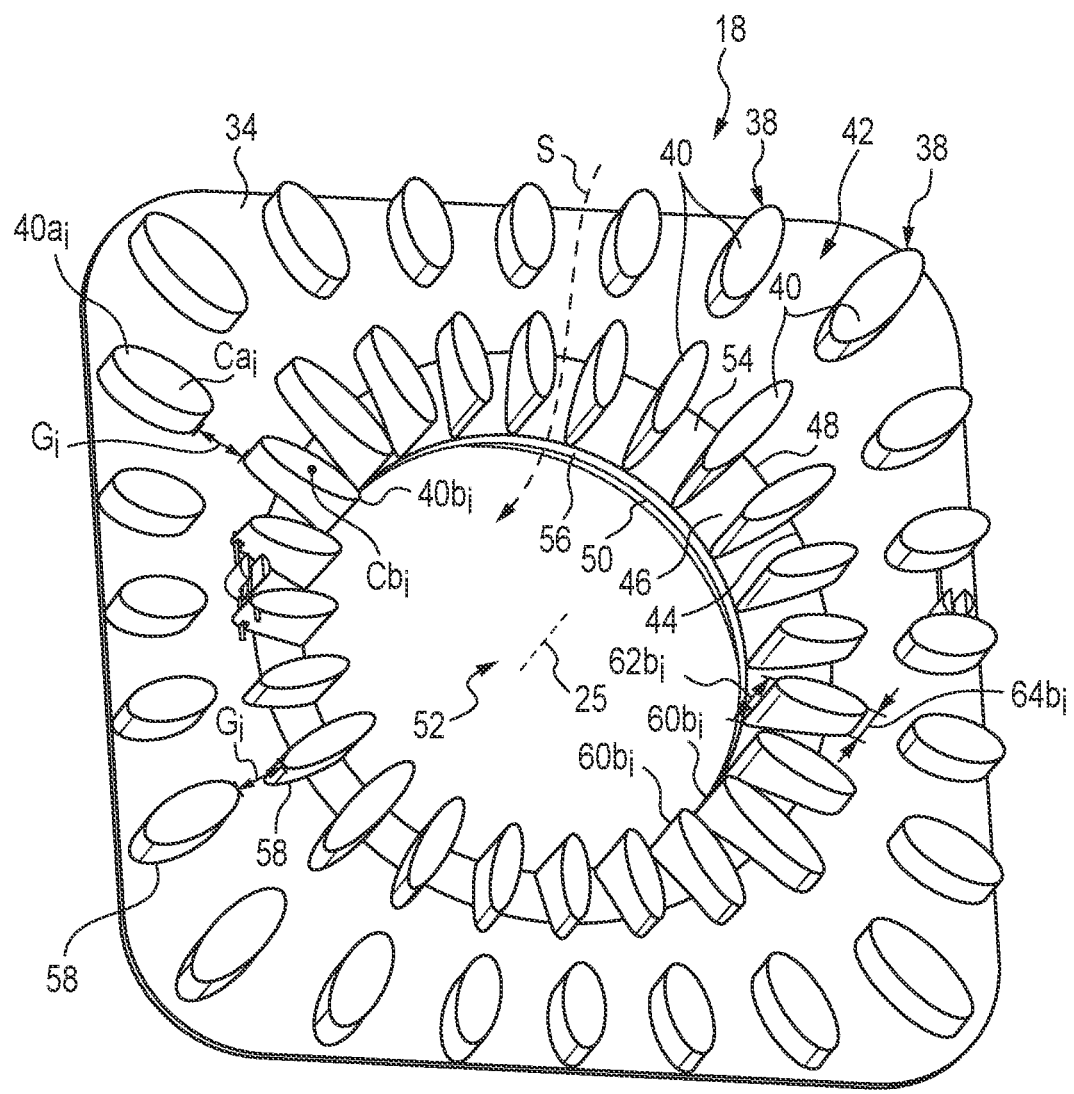
FIG. 8 is the perspective view of the bottom of the first plate of the grille of the ventilation assembly of FIG. 7 showing depth of the acoustic bodies.

FIGS. 7 and 8 depict an exemplary arrangement of the acoustic features 38 illustratively includes a pair of acoustic bodies 40, including outer acoustic body 40a and inner acoustic body 40b, although in some embodiments, the acoustic features 38 may include any suitable number of acoustic bodies 40 in forming phononic crystals. For example, an acoustic feature 38 may include three, four or more radially spaced acoustic bodies 40. Thus, the terms "inner" and "outer" when applied to acoustic bodies 40 are relative and are not to be interpreted as "innermost" and "outermost" unless context dictates otherwise. The outer acoustic bodies 40a are arranged annularly around the outlet aperture 44, and the inner acoustic bodies 40b are also arranged annularly around the outlet aperture 44, with the inner and outer acoustic bodies 40b,a aligned along the same radius. Each outer acoustic body 40a is arranged at a radial distance $da_i$ (e.g., $da_{1-a}$, for example of 1 through n acoustic features 38) between its centroid $Ca_i$ and a center axis 25 of the outlet aperture 44 that is greater than the radial distance $db_i$ (e.g., $db_{1-n}$, for example of 1 through n acoustic features 38) between the centroid $Cb_i$ of the corresponding inner acoustic body 40b of the same acoustic feature 38 and the center axis 25.

Each acoustic body 40 includes an outer perimeter 58 defining smooth aerodynamic shape, illustrated as approximating an ellipse, although in some embodiments, any suitable shape may be applied to each acoustic body 40. The inner and outer acoustic bodies 40a, 40b of each acoustic feature 38 are radially spaced apart from each other to define a gap $G_i$ between their outer perimeters 58. Each acoustic body 40 is arranged to extend longitudinally along the radial direction relative to the outlet aperture 44.

In the example embodiment of FIG. 7, the most radially inward portion $60b_i$ of each inner acoustic body 40b is coincident with the collar 46, and namely with in the mating section 56 of the collar 46. Alternatively, the most radially inward portion $60b_i$ may be spaced from the collar and the outlet aperture 44. In other alternative embodiments in which the grille 18 has no collar 46, the inner acoustic bodies 40b can be located on the top plate 34 and the most radially inward portion $60b_i$ can be coincident with the outlet aperture 44. In the embodiment depicted in FIG. 8, the most radially inward portion $60b_i$ of each inner acoustic body 40b defines a height $62b_i$ extending for connection with the inner surface of the collar 46, the height $62b_i$ being larger than a height $64b_i$ of the most radially outer portion of the inner acoustic body 40b due to the inwardly curved section 54 of collar 46. In alternative embodiments, the acoustic bodies 40 are of uniform height and are placed on a flat portion of the plates 34, 36. In the illustrative embodiment, the acoustic bodies 40 are formed as extruded-2-dimensional shapes having uniform dimensions of their outer perimeter 58 along their height, but in some embodiments, each acoustic body 40 may have curvature along its height.

Figure 9:
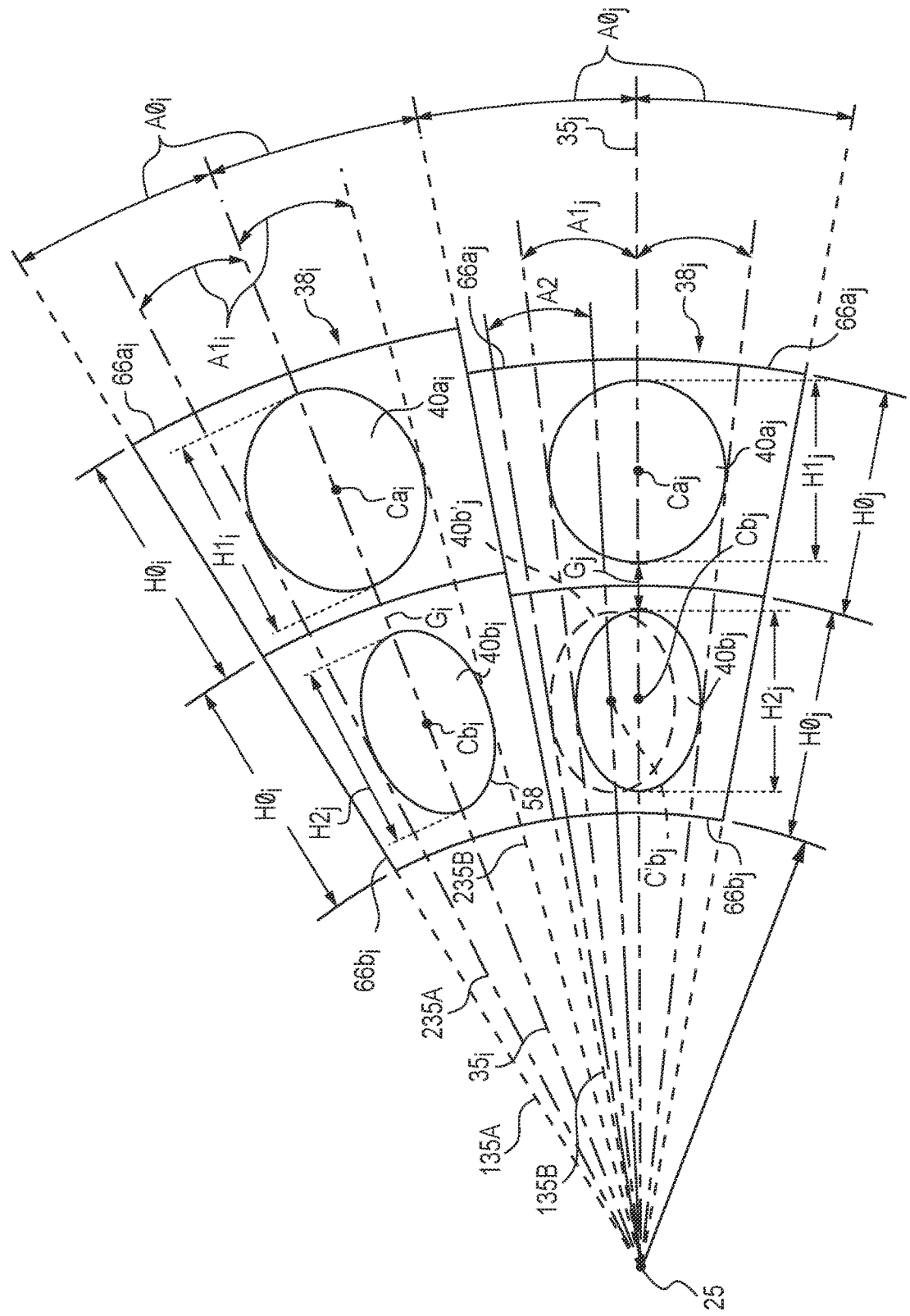
FIG. 9 is a diagrammatic view indicating an arrangement of the acoustic bodies of FIG. 8.

Referring now to FIG. 9, arrangements of the acoustic bodies 40 of individual acoustic features 38, and of the collective acoustic features 38 are discussed in terms of exemplary acoustic features $38_i$ and $38_j$ arranged adjacent one another. In particularly, each acoustic body 40 is configured according to a corresponding elementary cell $66x_{i,j}$ (e.g., $66a_{1-n}$, $66b_{1-n}$). Each elementary cell 66 can assist in defining the dimensions of the corresponding acoustic body 40, the relative positions between inner and outer acoustic bodies 40a, 40b of the same acoustic feature 38, and/or the open space between adjacent acoustic bodies 40, as discussed herein.

For example, in the annular arrangements of the acoustic bodies 40 of the illustrative embodiments, the centroids Ca, Cb of the acoustic bodies 40a, 40b are arranged co-linear on their corresponding center lines $35_{i,j}$. The lateral boundaries, and thus the width, of the elementary cells 66 are defined by the lines 135A, 135B, which are themselves defined at an angle A0 relative to their corresponding center lines $35_{i,j}$. The dimensions of the acoustic bodies 40 can be defined in terms of the parameters of their elementary cells 66. For example, the width of the acoustic bodies 40a, 40b of each acoustic feature 38 are defined such that the outer perimeter 58 of the outer and inner acoustic bodies 40a, 40b are respectively tangential to lines 235A, 235B, that are defined at an angle A1 relative to their corresponding center lines $35_{i,j}$. An angular ratio of the acoustic body 40 and its elementary cell 66 can be defined as A1/A0.

The longitudinal (radial) thickness of each cell 66 is defined as H0. The longitudinal (radial) thickness of each acoustic body 40 is indicated as H1. A thickness ratio of the acoustic body 40 and its elementary cell 66 can be defined as H1/H0.

The thickness H0 of the elementary cells 66a, 66b is illustratively defined to fix the center of the frequency bandgap for attenuation, according to the relationship $k*H0=\pi$, where k is the angular wavenumber in the surrounding fluid (e.g., air). The center of the frequency band can be defined accordingly to the relationship $$f = \frac{c}{2*H0},$$

where c is the speed of sound in the surrounding fluid (e.g., air). The width of the frequency band gap and the sound attenuation level are linked to the filling ratio r of the acoustic body 40 to its elementary cell 66, according to the relationship $$r = \frac{Sc}{Se},$$

where $S_c$ is 2-dimensional area defined by the perimeter 58 of the acoustic body 40, and Se is the 2-dimensional area defined by the elementary cell 66. The filing ratio r is related to each of the angular ratio A1/A0 and the thickness ratio H1/H0.

The acoustic bodies 40 can be made of any known material and provides the best performance with made of materials of high acoustical impedance. The acoustic bodies 40 may be solid or hollow. In one example, hollow acoustic bodies 40 may be used as Helmholtz resonators to dampen some frequencies. A solid acoustic body 40 could comprise an outer shell filled with any material. In one example, an acoustic body 40 could comprise a shell filled with a sound reducing material. One or more of the acoustic bodies 40 may be integrally formed as part of the upper plate 34 or the lower plate 36 or both 34, 36. Alternatively, one or more of the acoustic bodies 40 may be formed separate from the upper plate 34 and the lower plate 36 and affixed to one of the upper plate 34 or the lower plate 36 or both 34, 36 in any known manner consistent with this disclosure (e.g. adhesive, sonic welding, etc.). The acoustic bodies 40 may be manufactured by any known process (e.g. injection molding).

Figure 10:
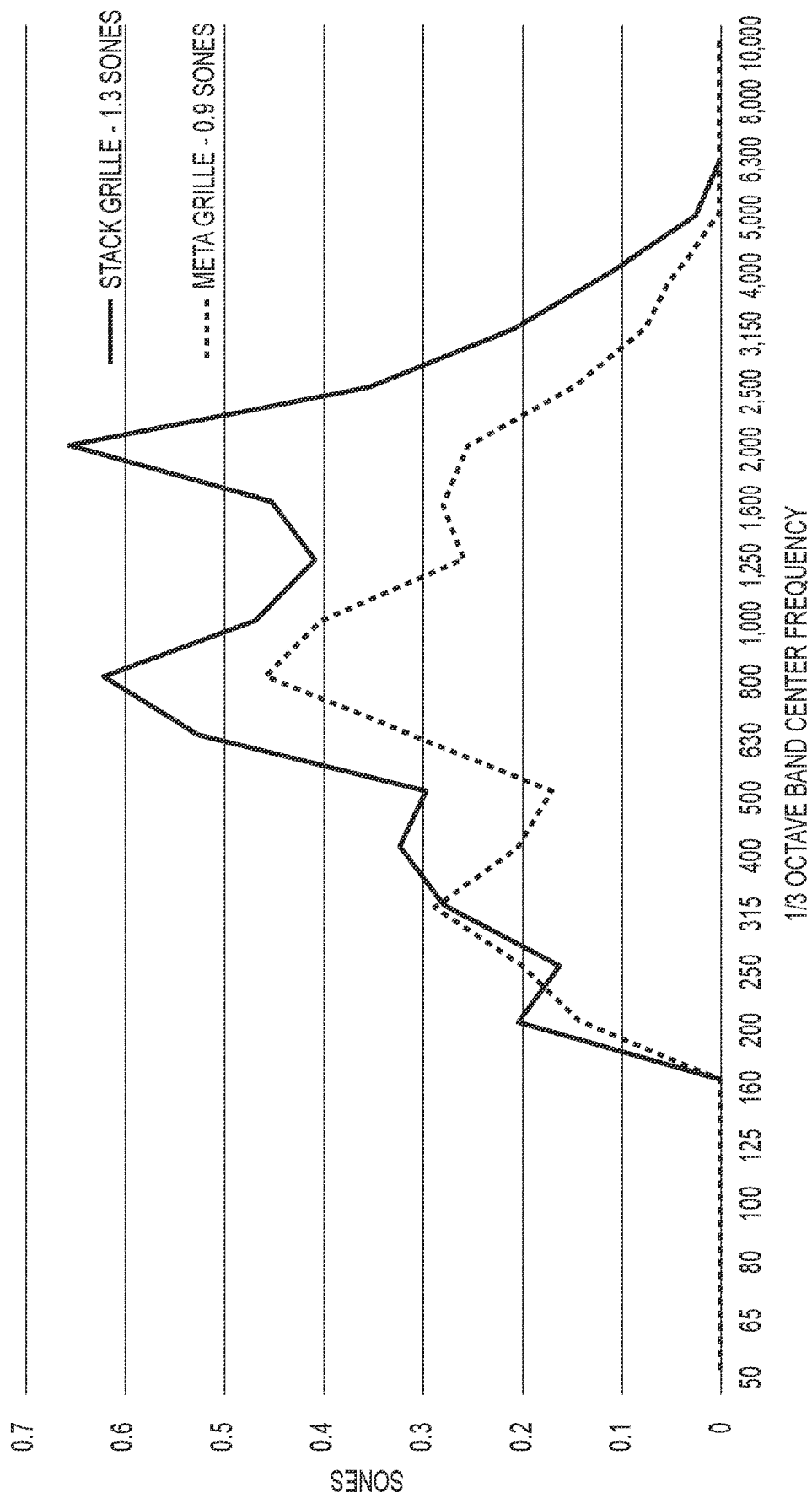
FIG. 10 is a graphical representation of the sound attenuation benefits of the present disclosure

Based on common conditions for bathroom ventilation applications, exemplary ranges of values can be determined for defining the arrangements of the acoustic features 38. For example, exemplary values can be determined for a frequency band of about 200 to about 4000 Hz defined by a ⅓ octave band center frequency as shown in FIG. 10. Exemplary values for such given conditions can include angular ratios within the range of about 0.3 to about 0.5 and/or thickness ratios within the range of about 0.6 to about 0.8. Exemplary values for the angle of A0 can include A0 within the range of about 5 degrees to about 10 degrees from centerline 35.

Returning to FIG. 9, with reference to the acoustic feature 38$_j$, the inner acoustic bodies 40$b$ are illustratively centered on their corresponding center line 35 together with the outer acoustic body 40$a$. However, in some embodiments, the inner acoustic bodies 40$b$ may be arranged off-center from their corresponding center line 35$_{i,j}$ such that their centroid C is spaced apart from the corresponding center line 35$_{i,j}$. For example, as shown in FIG. 9, the alternative inner acoustic body 40$b'_j$ is arranged slightly off-center from the center line 35$j$, such that the centroid Cb is arranged on a line 45$_j$ which defines an angle A21 from center line 35$_j$. Exemplary values for the angle A2 for given conditions can include A2 being no greater than about 1/10th of A0.

The discussion of arrangements of the acoustic bodies 40 applies generically to each acoustic body 40 of a given acoustic feature 38, yet the acoustic features 38 may be arranged differently from other acoustic features 38 according to the concepts discussed above, for example, according to the particular conditions, physical parameters (configuration of moving parts of the ventilation assembly, geometries of the grille, etc.) and/or other internal and/or external factors. Adjacent acoustic features, such as acoustic features 38$_{i,j}$ may differ in their arrangements but with preferred relationships there between, for example, to maintain overall circularity for the annular arrangements of the illustrative embodiments. Exemplary relationships can include variation of angles A0$_i$ and A0$_j$ of adjacent acoustic fixtures 38$_{i,j}$ relative to each other within the range of about 1/1.2 to about 1.2. Exemplary relationships can include variation in the thicknesses H0$_i$ and H0$_j$ of adjacent acoustic fixtures 38$_{i,j}$ relative to each other within the range of about 1/1.2 to about 1.2.

Referring to FIG. 10, a comparison is shown of the sound levels of an example ventilation assembly operating with a Stack Grille with the sound levels of the example ventilation assembly operating with the grille 18 according to the present disclosure (indicated as Meta Grille). Within the target ⅓ octaves (⅓ octave center band frequencies from 160 Hz to 6300 Hz) the level of sones from the Meta Grille were significantly reduced compared to the Stack Grille. A grille according to the description herein, including the example Meta Grille, with or without structural alterations within this disclosure, would reduce the level of sones in other frequency bands as well.

Figure 11:
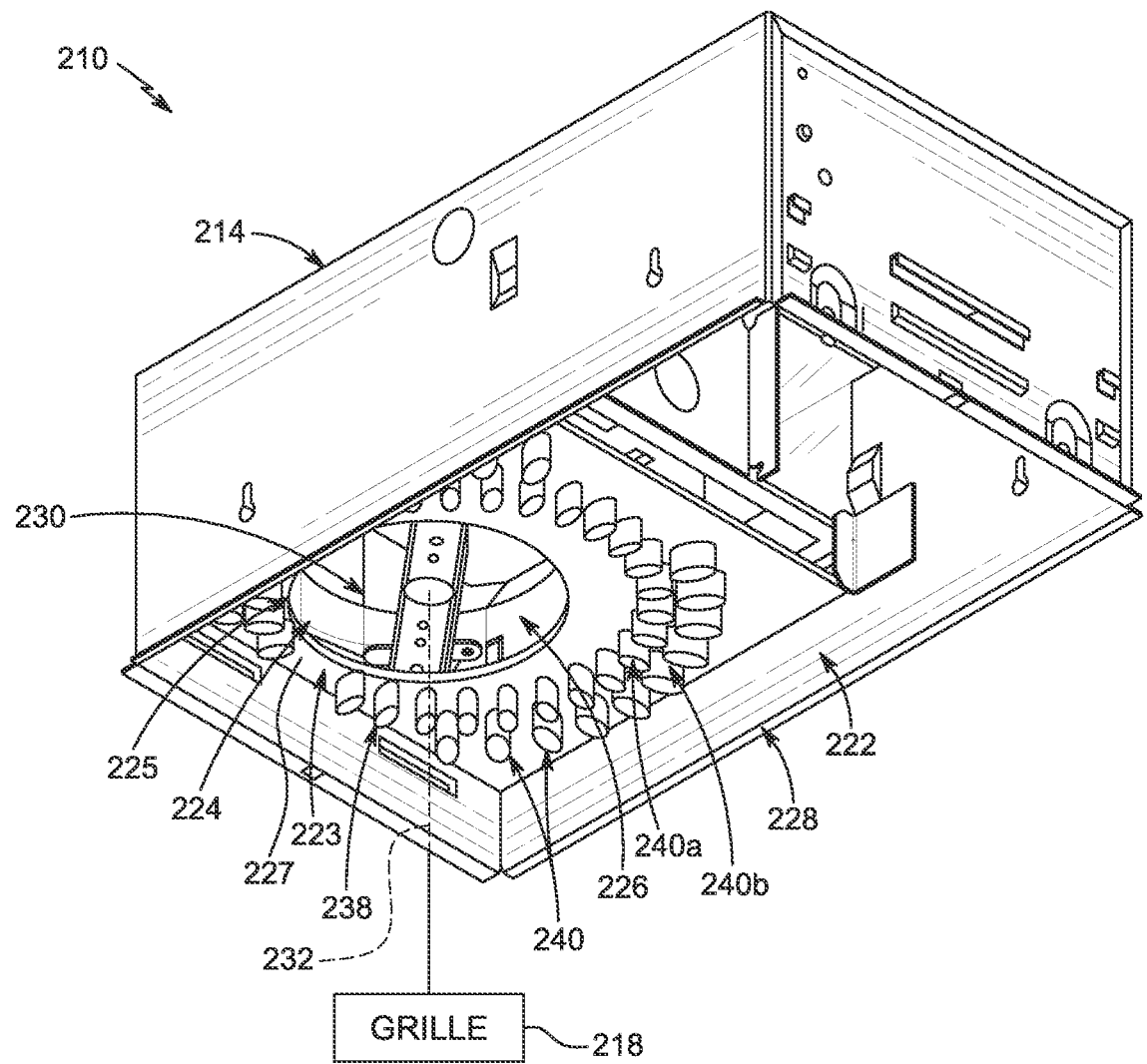
FIG. 11 is a perspective view of another illustrative embodiment of a ventilation assembly in accordance with the present disclosure including a partition plate included in a main housing and having a plurality of acoustic features formed thereon and that can be included in any of the ventilation assemblies described herein.

Referring to FIG. 11, a second embodiment of a ventilation assembly 210 including a main housing 214 defining an interior cavity 222, a grille 218 coupled to the main housing 214 to cover an opening in a ceiling, for example, and a partition plate 223 located within the interior cavity 222. As described below, the partition plate 223 includes acoustic bodies 240 which attenuate noise during operation of the ventilation assembly 210.

The interior cavity 222 houses a blower assembly 224. The blower assembly 24 includes a fan 226 operable by a motor to draw air from the adjacent room through the grille 218, through a main housing inlet 228 (via the optional adaptor ring 32 discussed below) into the inner cavity 222 of the main housing 214 and out through an exhaust 230 defined in the main housing inlet 228. The main housing 214 is illustratively shown as a square box, but in some embodiments may have any suitable arrangement including any suitable shape and/or size.

The grille 218 is illustratively arranged adjacent the inlet 228 of the main housing 214. The grille 218 is depicted as arranged in fluid communication with the interior cavity 222. An optional flexible adaptor ring, such as adaptor ring 32, may be utilized to communicate air through from the room through the grille 218 and into the interior cavity 222 to the acoustic bodies 240 in an aerodynamically efficient manner. The main housing inlet 228 is depicted as an entire rectangular side of the main housing 214, but could alternatively be only an aperture the size and shape of the flexible adaptor ring 32. The grille 218 may comprise other structures that direct air toward an outer perimeter of the acoustic bodies 240 so that the air flows radially through the acoustic bodies 240 to the blower assembly 224.

The partition plate 223 divides the interior cavity 222 into multiple sub-regions to separate various components such as the blower assembly 224 and other electrical systems or modules in the interior cavity 222. The partition plate 223 is spaced apart vertically from the grille 218 and defines a partition plate inlet 225 that opens toward the blower assembly 224. The partition plate inlet 225 is circular about a central axis 232. Each of the acoustic bodies 240 is optionally formed integrally with the partition plate 223 and extend from a bottom surface 227 of the partition plate 223 to extend downwardly toward the grille 218 and away from the blower assembly 224.

The acoustic bodies 240 are arranged around the central axis 232 and form an exemplary arrangement of the acoustic features 238 that illustratively includes a pair of acoustic bodies 240, including an inner acoustic body 240a and an outer acoustic body 240b, although in some embodiments, the acoustic features 238 may include any suitable number of acoustic bodies 240 in forming phononic crystals. For example, an acoustic feature 238 may include only one or three, four or more radially spaced acoustic bodies 240. Thus, the terms "inner" and "outer" when applied to acoustic bodies 240 are relative and are not to be interpreted as "innermost" and "outermost" unless context dictates otherwise.

The inner and outer acoustic bodies 240a, 240b are staggered circumferentially about the central axis 232 in the illustrative embodiment although in some embodiments the acoustic bodies 240a, 240b may be circumferentially aligned. Thus, each outer acoustic body 240b is arranged approximately between two neighboring inner acoustic bodies 240a and is spaced radially outward from the inner acoustic bodies 240a. Each of the acoustic bodies 240 has an elliptical shape with a centerline that extends through the central axis 232, however, as described in other embodiments herein, one or more of the acoustic bodies 240 can have other suitable shapes including a circular shape.

As shown in FIG. 11, the inner and outer acoustic bodies 240a, 240b need not extend all the way around the central axis 232 of the inlet 225 if space does not permit. Thus, some circumferential positions around the central axis 232 may have only one inner or outer acoustic body 240a, 240b, or no acoustic bodies 240. In the illustrative embodiment, greater than 50% of the circumference of the inlet 225 has both inner and outer acoustic bodies 240a, 240b and less than 10% of the circumference has no acoustic bodies 240.

Figure 12:
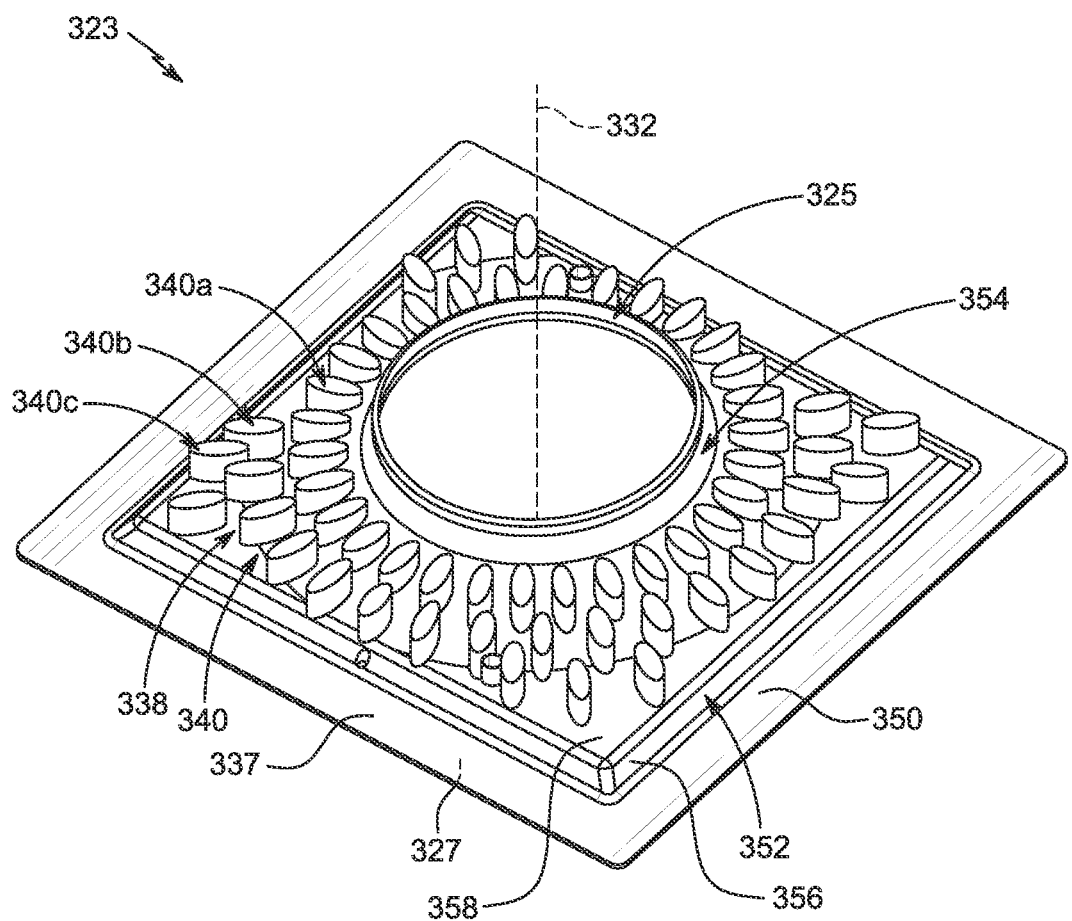
FIG. 12 is a perspective view of another embodiment of a partition plate included in a main housing and having a plurality of acoustic features formed thereon and that can be included in any of the ventilation assemblies described herein.

Another embodiment of a partition 323 that can be used in any of the ventilation assemblies described herein is shown in FIG. 12. The partition plate 323 is substantially similar to partition plate 223 except that a plurality of acoustic bodies 340 are formed on a top surface 337 of the partition plate 323 instead of a bottom surface 327.

The partition plate 323 is configured to divide an interior cavity of a main housing (i.e. main housing 214) into multiple sub-regions to separate various components such as the blower assembly 224 and other electrical systems or modules in the interior cavity 222. When fully installed on a main housing, the partition plate 323 is spaced apart vertically from a grille (i.e. the grille 218) and defines a partition plate inlet 325. The inlet 325 is circular about a central axis 332. Each of the acoustic bodies 340 is optionally formed integrally with the partition plate 323. When the partition plate 323 is fully installed in the housing 314, each of the acoustic bodies 340 extend upwardly away from the grille and toward the blower assembly.

The acoustic bodies 340 are arranged around the central axis 332 and form an exemplary arrangement of the acoustic features 338 that illustratively includes a trio of acoustic bodies 340, including an inner acoustic body 340a and a middle acoustic body 340b, and an outer acoustic body 340c, although in some embodiments, the acoustic features 338 may include any suitable number of acoustic bodies 340 in forming phononic crystals. For example, an acoustic feature 338 may include one, two, four, or more radially spaced acoustic bodies 340. Thus, the terms "inner" and "outer" when applied to acoustic bodies 340 are relative and are not to be interpreted as "innermost" and "outermost" unless context dictates otherwise.

Some of the acoustic bodies 340a, 340b, 340c are staggered circumferentially about the central axis 332 in the illustrative embodiment. For example, each middle acoustic body 340b is arranged approximately between two neighboring inner acoustic bodies 340a and each outer acoustic body 340c is arranged approximately between two neighboring middle acoustic bodies 340b. Each of the acoustic bodies 340 has an elliptical shape with a centerline that extends through the central axis 332, however, as described in other embodiments herein, one or more of the acoustic bodies 340 can have other suitable shapes including a circular shape.

As shown in FIG. 12, the acoustic bodies 340a, 340b, 340c may not extend all the way around the central axis 332 of the inlet 325. Thus, some circumferential positions around the central axis 332 may have only an inner acoustic body 340a, or only an inner and a middle acoustic body 340a, 340b. In the illustrative embodiment, greater than 50% of the circumference of the inlet 325 has only inner and middle acoustic bodies 340a, 340b and less than 10% of the circumference has inner, middle, and outer acoustic bodies 340a, 340b, 340c.

The partition plate 323 includes a peripheral rim 350, a central pane 352 coupled to an inner edge of the peripheral rim 350, and a collar 354 coupled to an inner edge of the central pane 352 as shown in FIG. 12. The peripheral rim 350 is square-shaped in the illustrative embodiment and is configured to attach to portions of the main housing to support the partition plate 323 relative to the blower assembly. In other embodiments, other shapes including rectangular, circular, triangular, or other suitable polygonal shapes may also be used. The central pane 352 is similarly shaped to the peripheral rim 350 and includes a shoulder 356 coupled to the peripheral rim 350 and a panel 358 interconnecting the shoulder 356 and the collar 354. The collar 354 extends upwardly away from the panel 358 in the same direction as the acoustic bodies 340. Each of the acoustic bodies 340 is coupled to the panel 358 and/or the shoulder 356 and is configured to attenuate sound by interacting with air flowing outwardly away from the central axis 332.

Figure 13:
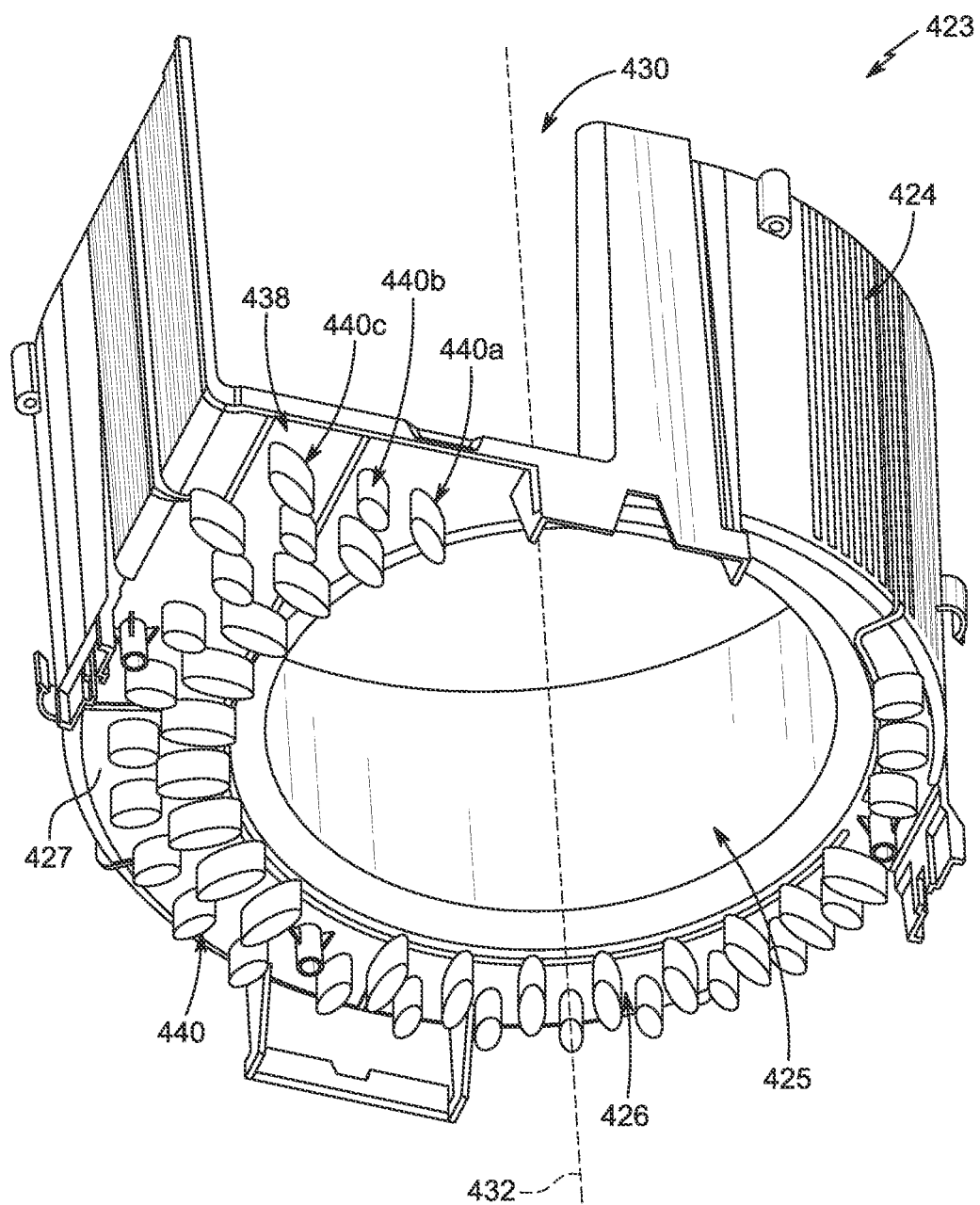
FIG. 13 is perspective view of a scroll housing including a plurality of acoustic features formed thereon and that can be included in any of the ventilation assemblies described herein.

Referring to FIG. 13, some illustrative ventilation assemblies may not have a partition plate such as plates 223, 323. Instead, any of the ventilation assemblies described herein can have a scroll housing 423 which is arranged within a main housing (i.e. main housing 14, 214) and which contains a fan (i.e. fan 26, 226). The scroll housing 423 includes a side wall 424 and a bottom wall 426. The bottom wall 426 defines an inlet 425 while the side wall defines an outlet 430. During operation in which the fan rotates about a central axis 432 of the inlet 425 within the scroll housing 423, air is drawn upwardly through the inlet 425 and is released through the outlet 430.

The scroll housing 423 further includes a plurality of acoustic bodies 440 extending from a bottom surface 427 of the bottom wall 426 as shown in FIG. 13. The plurality of acoustic bodies 440 extend downwardly away from the bottom wall 426 and the side wall 424. The acoustic bodies 440 are arranged around the central axis 432 and form an exemplary arrangement of the acoustic features 438 that illustratively includes a trio of acoustic bodies 440, including an inner acoustic body 440a, a middle acoustic body 440b, and an outer acoustic body 440c, although in some embodiments, the acoustic features 438 may include any suitable number of acoustic bodies 440 in forming phononic crystals. For example, an acoustic feature 438 may include one, two, four, or more radially spaced acoustic bodies 440. Thus, the terms "inner" and "outer" when applied to acoustic bodies 340 are relative and are not to be interpreted as "innermost" and "outermost" unless context dictates otherwise.

Some of the acoustic bodies 440a, 440b, 440c are staggered circumferentially about the central axis 432 in the illustrative embodiment. For example, each middle acoustic body 440b is arranged approximately between two neighboring inner acoustic bodies 440a and each outer acoustic body 440c is arranged approximately between two neighboring middle acoustic bodies 440b. Each of the acoustic bodies 440 has an elliptical shape with a centerline that extends through the central axis 432, however, as described in other embodiments herein, one or more of the acoustic bodies 440 can have other suitable shapes including a circular shape.

As shown in FIG. 13, the acoustic bodies 440a, 440b, 440c may not extend all the way around the central axis 432 of the inlet 425. Thus, some circumferential positions around the central axis 432 may have only an inner acoustic body 440a, or only an inner and a middle acoustic body 440a, 440b. In the illustrative embodiment, greater than 50% of the circumference of the inlet 425 has only inner and middle acoustic bodies 440a, 440b and less than 10% of the circumference has inner, middle, and outer acoustic bodies 440a, 440b, 440c.

Another embodiment of a ventilation assembly 510 is shown in FIGS. 14-17. The ventilation assembly 510 includes a main housing 514 defining an interior cavity 522 and a grille 518 coupled to the main housing 514 to cover an opening in a ceiling C, for example. As described below, the grille 518 includes acoustic bodies 540 which attenuate noise during operation of the ventilation assembly 510.

The interior cavity 522 houses a blower assembly 524. The blower assembly 524 includes a fan 526 operable by a motor to draw air from the adjacent room through the grille 518, through an inlet 528 (via the optional adaptor ring 532 discussed below) into the inner cavity 522 of the main housing 514 and out through an exhaust 530. The main housing 514 is illustratively shown as a square box, but in some embodiments may have any suitable arrangement including any suitable shape and/or size.

The grille 518 is illustratively arranged adjacent the inlet 528 of the main housing 514. The grille 518 is depicted as arranged in fluid communication with the interior cavity 522. An optional flexible adaptor ring 532 may be utilized to communicate air through from the grille 518 and into the interior cavity 522 in an aerodynamically efficient manner. The main housing inlet 528 is depicted as an entire rectangular side of the main housing 514, but could alternatively be only an aperture the size and shape of the flexible adaptor ring 532.

Figure 14:
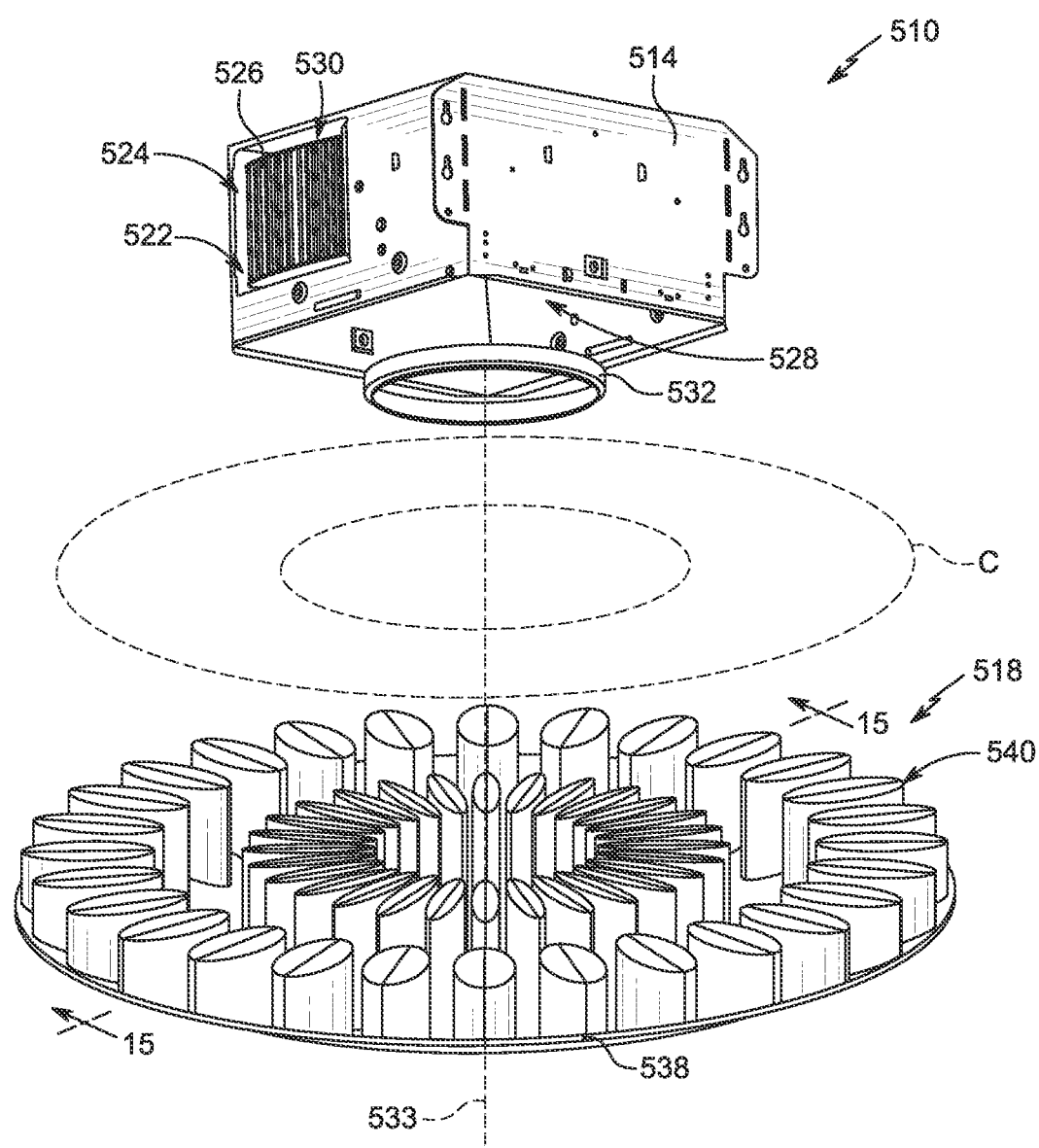
FIG. 14 is an exploded assembly view of another exemplary embodiment of a ventilation assembly in accordance with the present disclosure.
Figure 15:
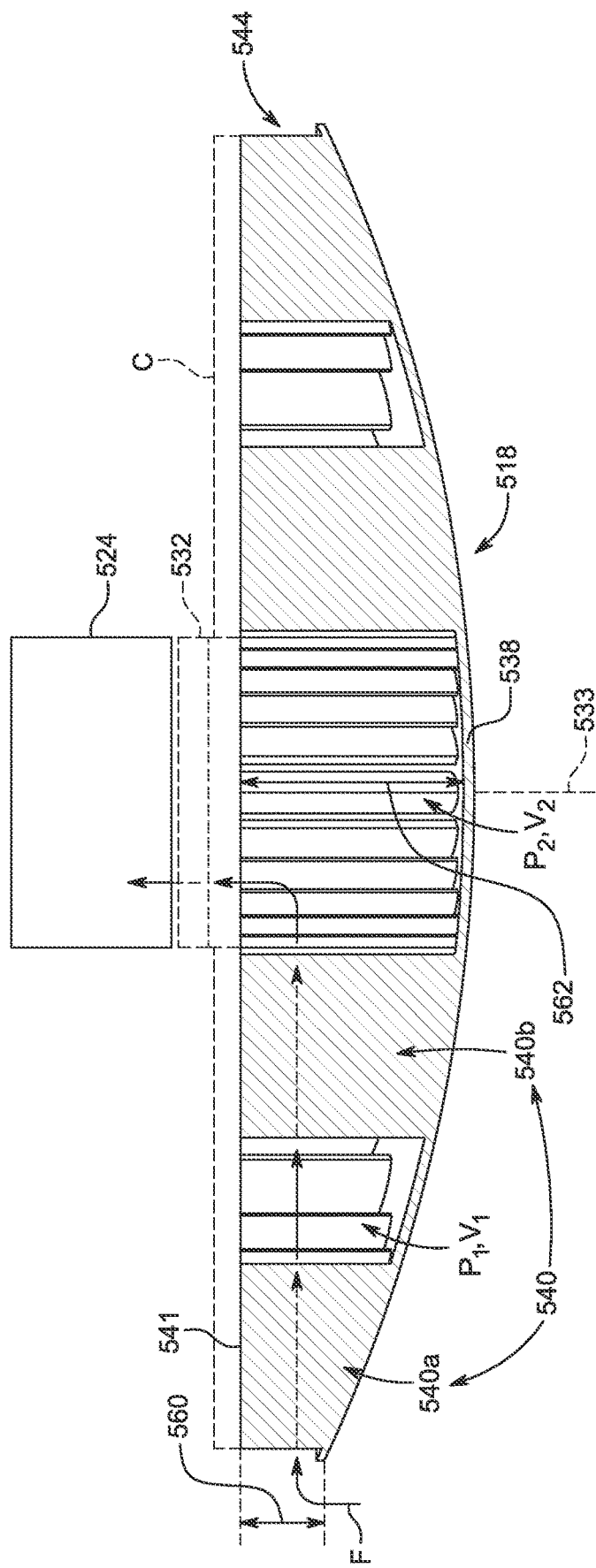
FIG. 15 is a cross sectional view of a grille included in the ventilation assembly and taken along line 15-15 in FIG. 14.

The grille 518 includes a dome-shaped panel 538 and the plurality of acoustic bodies 540 extend from an upper surface 537 of the dome-shaped panel 538 as shown in FIGS. 14 and 15. The dome-shaped panel 538 is imperforate such that no air can flow therethrough. Each of the acoustic bodies 540 is optionally formed integrally with the dome-shaped panel 538 and are extend upwardly toward the main housing 514 and toward the blower assembly 524. When the ventilation assembly 510 is fully installed, the plurality of acoustic bodies 540 may optionally contact the ceiling C to block airflow above the acoustic bodies 540 and so that airflow occurs only between the acoustic bodies radially inward toward a central axis 533 of the grille 518.

The acoustic bodies 540 are spaces apart circumferentially about the central axis 533 from one another and form an exemplary arrangement of the acoustic features 544 that illustratively includes a pair of acoustic bodies 540, including an inner acoustic body 540a and an outer acoustic body 540b, although in some embodiments, the acoustic features 544 may include any suitable number of acoustic bodies 540 in forming phononic crystals. For example, an acoustic feature 544 may include only one or three, four or more radially spaced acoustic bodies 540. Thus, the terms "inner" and "outer" when applied to acoustic bodies 540 are relative and are not to be interpreted as "innermost" and "outermost" unless context dictates otherwise.

The inner and outer acoustic bodies 540a, 540b are aligned circumferentially about the central axis 533 and spaced radially from the central axis 533 in the illustrative embodiment. Each of the acoustic bodies 540 has an elliptical shape with a centerline that extends through the central axis 533, however, as described in other embodiments herein, one or more of the acoustic bodies 540 can have other suitable shapes including a circular shape.

Figure 16:
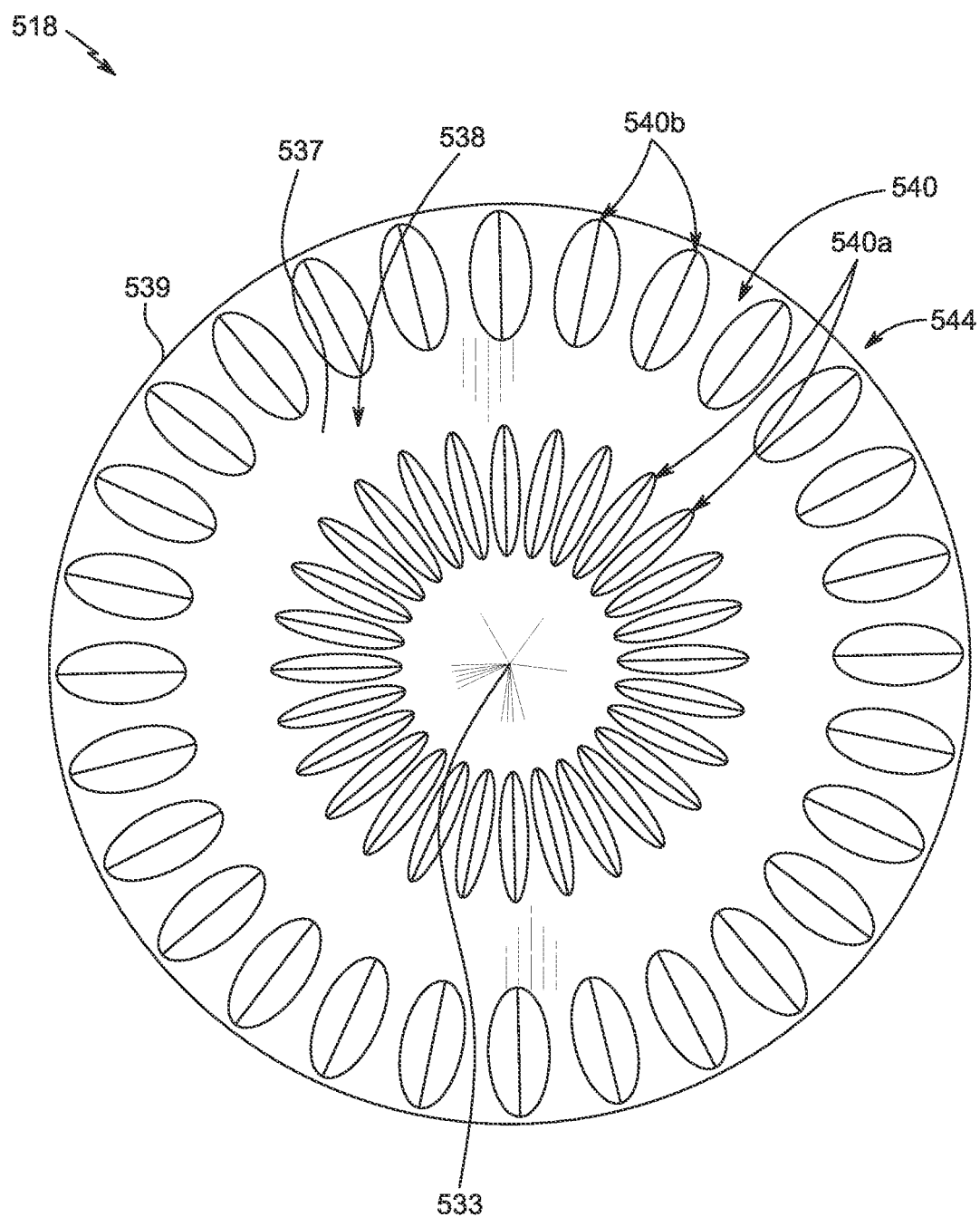
FIG. 16 is a top view of the grille from FIGS. 14 and 15 showing that the grille is formed to include a plurality of acoustic features.

Referring to FIG. 16, the outer acoustic bodies 540b have a larger cross sectional area compared to the inner acoustic bodies 540a, however, a radial length of each acoustic body 540 may be substantially or approximately the same (i.e. within 5% of each other). Additionally, circumferential spacing between the outer acoustic bodies 540b is greater than circumferential spacing between the inner acoustic bodies 540a. The outer acoustic bodies 540b are spaced slightly inward from an outer edge 539 of the dome-shaped panel 538.

Figure 17:
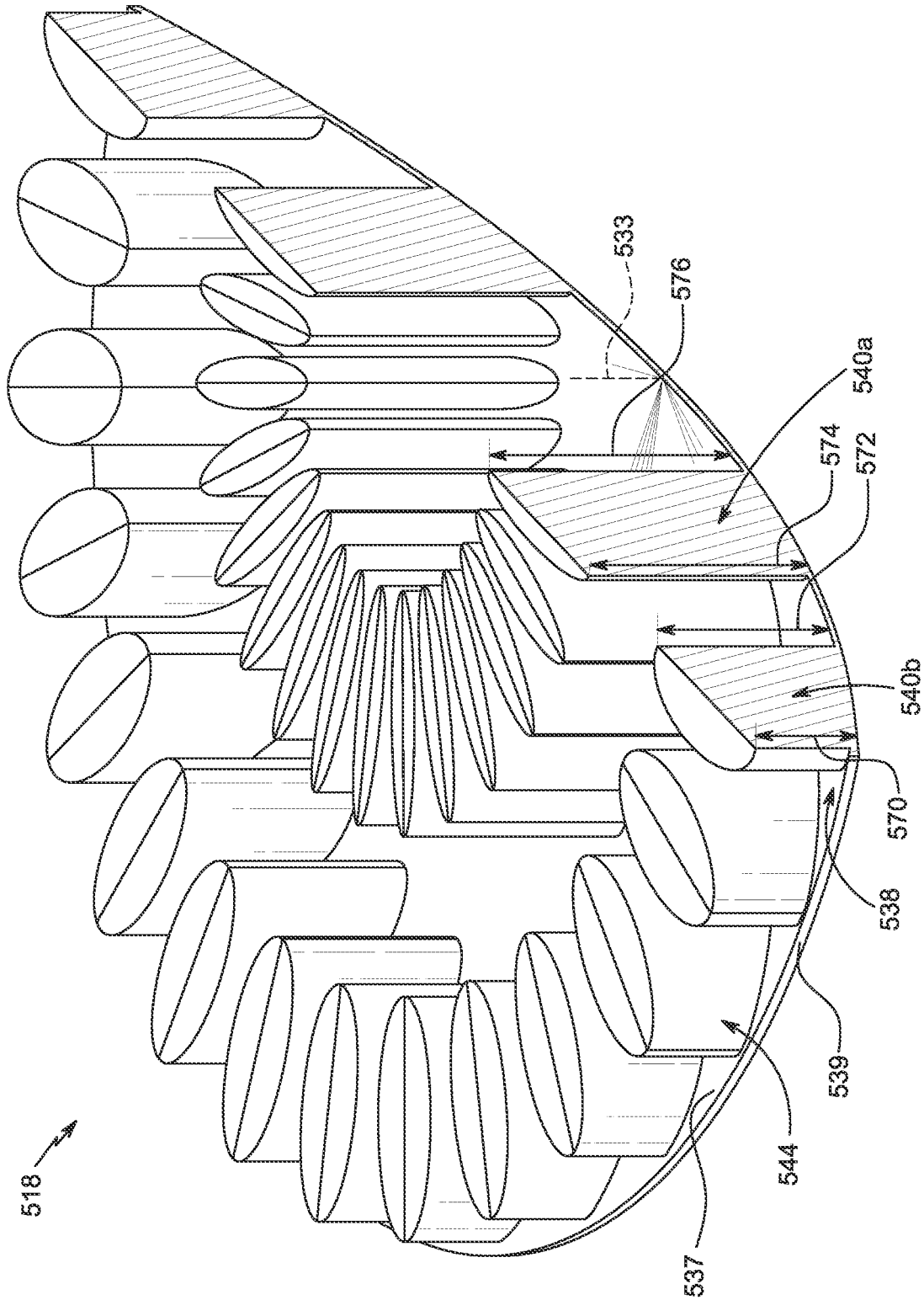
FIG. 17 is a perspective and cross sectional view of the grille of FIG. 16.

Referring to FIG. 17, a height of each of the acoustic bodies 540 varies as the acoustic bodies 540 extend radially inward toward the central axis 533 due to the dome-shaped panel 538. Illustratively, the outer acoustic bodies 540b have a first height 570 at a radially outer end thereof and a second height 572 at a radially inner end thereof. Likewise, the inner acoustic bodies 540a have a third height 574 at a radially outer end thereof and a fourth height 576 at a radially inner end thereof. The heights 570, 572, 574, 576 progressively get larger due to the shape of the dome shaped panel 538.

The structure of the grille 518 and ductwork (i.e. adaptor 532 or other structure of main housing 514 leading to the fan 526) leading to the fan 526 provides an expansion chamber effect that reduces sound produced by the ventilation assembly 510 during operation. In particular, the shape of the dome-shaped panel 538 slopes downwardly toward the central axis 533 to provide the upper surface 537 with a concave shape relative to the ductwork 532. The concave upper surface 537 and the ceiling C cooperate to define a flowpath that leads to the ductwork for an airflow F to flow vertically therebetween as shown in FIG. 15.

The upper surface 537 is spaced a first distance 560 from an upper end 541 of each of the acoustic bodies 540 and the ceiling C at an outer peripheral edge 539 of the dome-shaped panel 538. The upper surface 537 is spaced a second distance 562 from the upper end 541 and the ceiling C at the central axis 533. The second distance 562 is greater than the first distance 560 to provide a greater volumetric space between the dome-shaped panel 538 and the ceiling C the closer to the central axis 533. This volumetric change provided by the dome-shaped panel 538 causes the airflow to decrease in pressure from a first pressure $P_1$ closer to the outer edge 539 to a second pressure $P_2$ closer to the central axis 533. This volumetric change provided by the dome-shaped panel 538 also causes the airflow to decrease in velocity from a first velocity $V_1$ closer to the outer edge 539 to a second velocity $V_2$ closer to the central axis 533. These changes in pressure and/or velocity contribute to decreasing sound produced by the ventilation assembly 510.

It should be noted that while the dome-shaped panel 538 is used in the illustrative embodiment, in other embodiments, the expansion chamber effect may be produced by other panels having other shapes. Such shapes may include a conical structure, for example. Additionally, in other embodiments, the expansion chamber effect may occur as a result of increasing distance between the panel 538 from the outer edge 539 to the central axis 533 followed by a decrease in volumetric area in the ductwork leading to the fan 526.

Another embodiment of a ventilation assembly 610 is shown in FIGS. 18-22. The ventilation assembly 610 includes a main housing 614 defining an interior cavity 622 and a grille 618 coupled to the main housing 614 to cover an opening in a ceiling C, for example. As described below, the grille 618 includes acoustic bodies 640 which attenuate noise during operation of the ventilation assembly 610.

The interior cavity 622 houses a blower assembly 624. The blower assembly 624 includes a fan 626 operable by a motor to draw air from the adjacent room through the grille 618, through an inlet 628 (via the optional adaptor ring 632 or ductwork discussed below) into the inner cavity 622 of the main housing 614 and out through an exhaust 630. The main housing 614 is illustratively shown as a square box, but in some embodiments may have any suitable arrangement including any suitable shape and/or size.

The grille 618 is illustratively arranged adjacent the inlet 628 of the main housing 614. The grille 618 is depicted as arranged in fluid communication with the interior cavity 622. An optional flexible adaptor ring 632 may be utilized to communicate air through from the room through the grille 618 and into the interior cavity 622 to the acoustic bodies 640 in an aerodynamically efficient manner. The main housing inlet 628 is depicted as an entire rectangular side of the main housing 614, but could alternatively be only an aperture the size and shape of the flexible adaptor ring 632.

Figure 18:
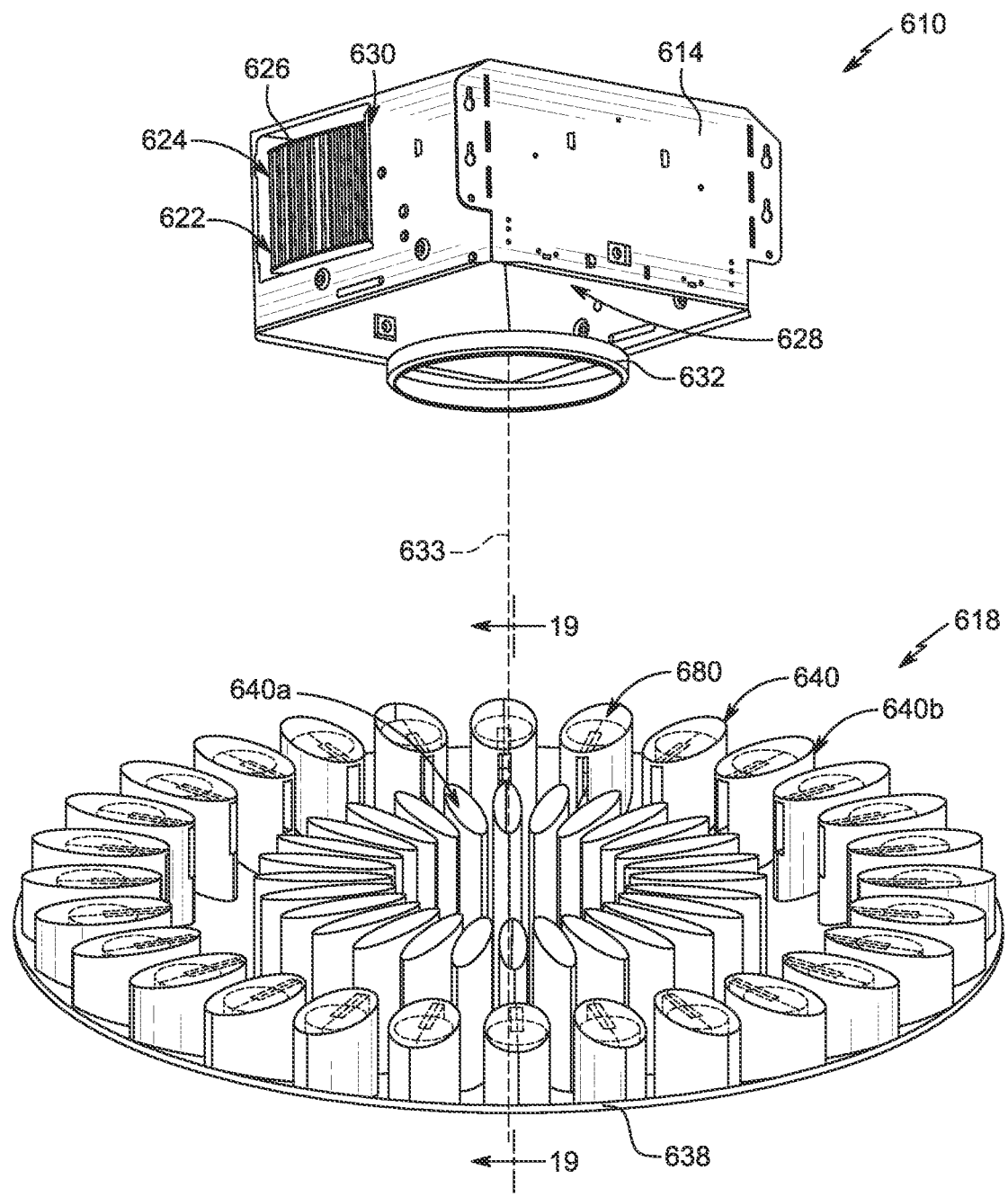
FIG. 18 is an exploded assembly view of another exemplary embodiment of a ventilation assembly in accordance with the present disclosure.
Figure 19:
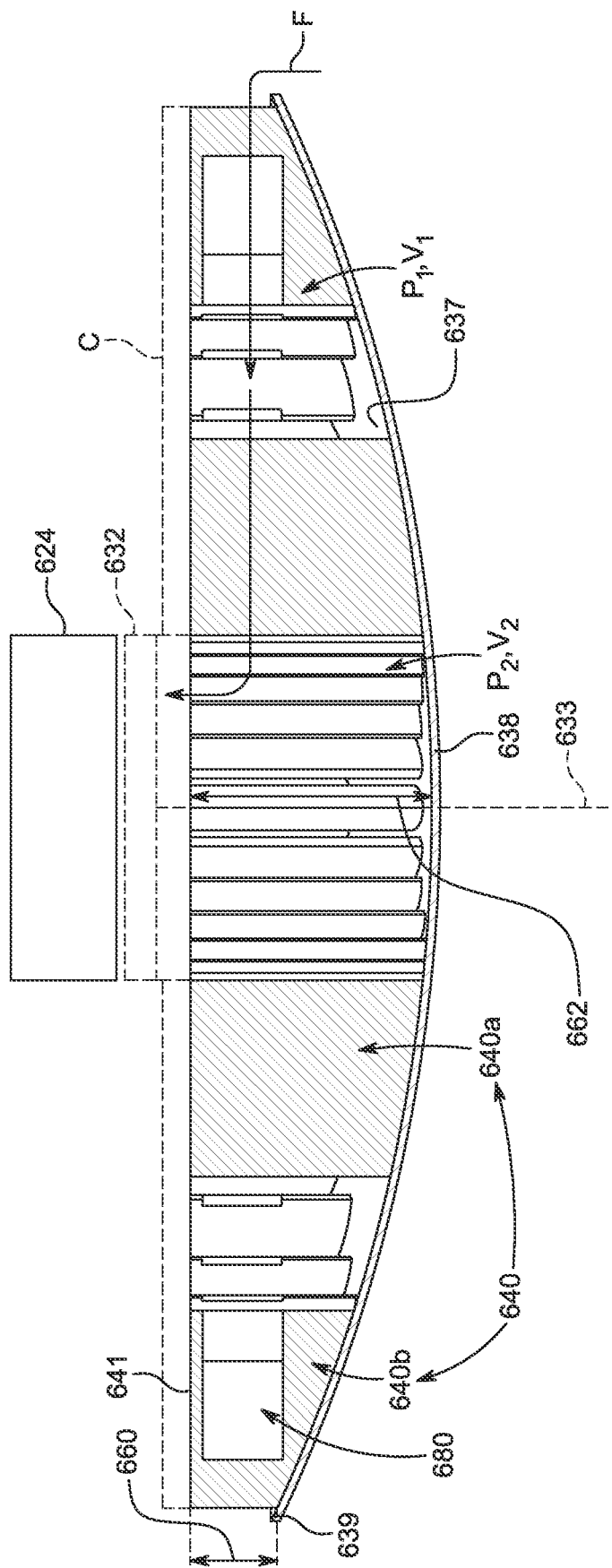
FIG. 19 is a cross sectional view of a grille included in the ventilation assembly and taken along line 19-19 in FIG. 18.

The grille 618 includes a dome-shaped panel 638 and the plurality of acoustic bodies 640 coupled to an upper surface 637 of the dome-shaped panel 638 as shown in FIGS. 18 and 19. The dome-shaped panel 638 is imperforate such that no air can flow therethrough. Each of the acoustic bodies 640 is formed integrally with the dome-shaped panel 638 and are extend upwardly toward the main housing 614 and toward the blower assembly 624. When the ventilation assembly 610 is fully installed, the plurality of acoustic bodies 640 may optionally contact the ceiling C to block airflow above the acoustic bodies 640 and so that airflow occurs only between the acoustic bodies 640 radially inward toward a central axis 633 of the grille 618.

The acoustic bodies 640 are spaces apart circumferentially about the central axis 633 from one another and form an exemplary arrangement of the acoustic features 644 that illustratively includes a pair of acoustic bodies 640, including an inner acoustic body 640a and an outer acoustic body 640b, although in some embodiments, the acoustic features 644 may include any suitable number of acoustic bodies 640 in forming phononic crystals. For example, an acoustic feature 644 may include only one or three, four or more radially spaced acoustic bodies 640. Thus, the terms "inner" and "outer" when applied to acoustic bodies 640 are relative and are not to be interpreted as "innermost" and "outermost" unless context dictates otherwise.

The inner and outer acoustic bodies 640a, 640b are aligned circumferentially about the central axis 633 and spaced radially from the central axis 633 in the illustrative embodiment. Each of the acoustic bodies 640 has an elliptical shape with a centerline that extends through the central axis 633, however, as described in other embodiments herein, one or more of the acoustic bodies 640 can have other suitable shapes including a circular shape.

Figure 20:
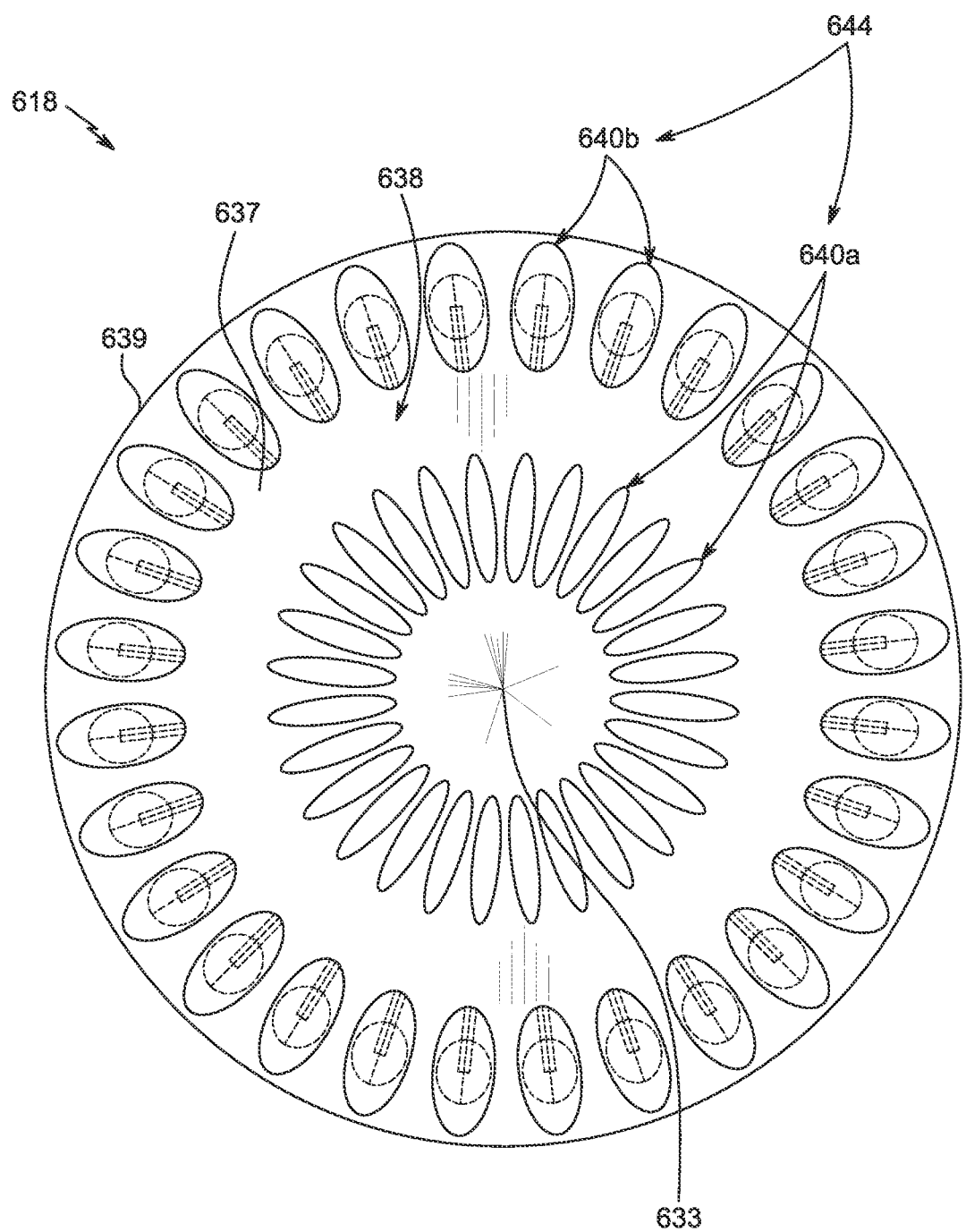
FIG. 20 is a top view of the grille from FIGS. 18 and 19 showing that the grille is formed to include a plurality of acoustic features.

Referring to FIG. 20, the outer acoustic bodies 640b have a larger cross sectional area compared to the inner acoustic bodies 640a, however, a radial length of each acoustic body 640 may be substantially or approximately the same (i.e. within 5% of each other). Additionally, circumferential spacing between the outer acoustic bodies 640b is greater than circumferential spacing between the inner acoustic bodies 640a. The outer acoustic bodies 640b are spaced slightly inward from an outer edge 639 of the dome-shaped panel 638.

Figure 21:
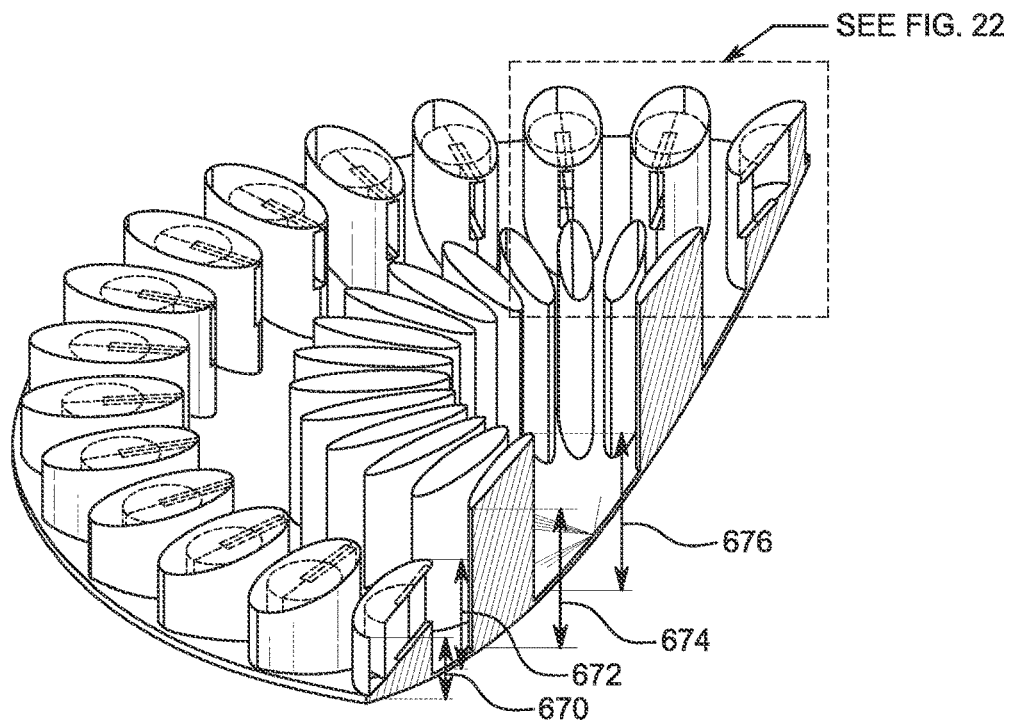
FIG. 21 is a perspective and cross sectional view of the grille of FIG. 20.

Referring to FIG. 21, a height of each of the acoustic bodies 640 varies as the acoustic bodies 640 extend radially inward toward the central axis 633. Illustratively, the outer acoustic bodies 640b have a first height 670 at a radially outer end thereof and a second height 672 at a radially inner end thereof. Likewise, the inner acoustic bodies 640a have a third height 674 at a radially outer end thereof and a fourth height 676 at a radially inner end thereof. The heights 670, 672, 674, 676 progressively get larger due to the shape of the dome shaped panel 638.

The structure of the grille 618 and ductwork (i.e. adaptor 632 or other structure of main housing 614 leading to the fan 626) leading to the fan 626 defines an expansion chamber that reduces sound produced by the ventilation assembly 610 during operation. The dome-shaped panel 638 slopes downwardly toward the central axis 633 to provide the upper surface 637 with a concave shape relative to the ductwork 632. The concave upper surface 637 and the ceiling C cooperate to define a flowpath that leads to the ductwork for an airflow F to flow vertically therebetween as shown in FIG. 19.

The upper surface 637 is spaced a first distance 660 from an upper end 641 of each of the acoustic bodies 640 and the ceiling C at an outer peripheral edge 639 of the dome-shaped panel 638. The upper surface 637 is spaced a second distance 662 from the upper end 641 and the ceiling C at the central axis 633. The second distance 662 is greater than the first distance 660 to provide a greater volumetric space between the dome-shaped panel 638 and the ceiling C the closer to the central axis 633. This volumetric change provided by the dome-shaped panel 638 causes the airflow to decrease in pressure from a first pressure $P_1$ closer to the outer edge 639 to a second pressure $P_2$ closer to the central axis 633. This volumetric change provided by the dome-shaped panel 638 also causes the airflow to decrease in velocity from a first velocity $V_1$ closer to the outer edge 639 to a second velocity $V_2$ closer to the central axis 633. These changes in pressure and/or velocity contribute to decreasing sound produced by the ventilation assembly 610.

It should be noted that while the dome-shaped panel 638 is used in the illustrative embodiment, in other embodiments, the expansion chamber effect may be produced by other panels having other shapes. Such shapes may include a conical structure, for example. Additionally, in other embodiments, the expansion chamber effect may occur as a result of increasing distance between the panel 638 from the outer edge 639 to the central axis 633 followed by a decrease in volumetric area in the ductwork leading to the fan 626.

Figure 22:
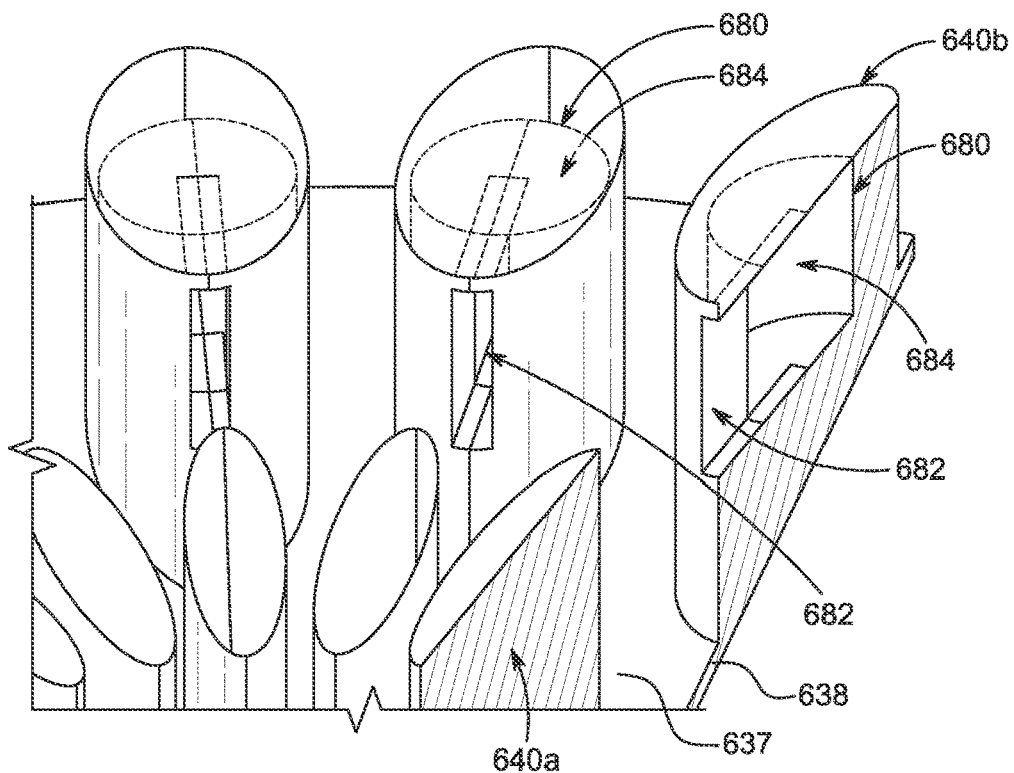
FIG. 22 is an enlarged portion of the grille of FIG. 21.

In the ventilation assembly 610, each of the outer acoustic bodies 640b is configured to provide a resonator 680 that assists in attenuating sounds produced by the ventilation assembly 610 during operation as shown in FIGS. 21 and 22. Each resonator 680 is illustratively a Helmholtz resonator that is defined by interior surfaces of each outer acoustic body 640b that provide a neck region 682 and a body region 684 as shown in FIG. 22. The neck region 682 opens toward the central axis 633 and, thus, is formed in a radially inner end of each of the outer acoustic bodies 640*b*. The body region 684 is formed directly radially outward from the neck region 682 in fluid communication with the neck region 682. The body region 684 has a circular or oval shape with an overall volume that is less than each outer acoustic body 640*b*.

Although the present disclosure illustrates resonators 680 on each outer acoustic body 640*b*, it should be appreciated that only some of the outer acoustic bodies 640*b* may be formed to include a resonator 680. In some embodiments, resonators 680 may also be formed in one or more inner acoustic bodies 640*a*.

The resonators 680 may be tuned by adjusting various dimensions of the neck region 682 and/or the body region 684. Each resonator may be tuned according to the following formula:

$$f = \frac{c}{2\pi}\sqrt{\frac{Scol}{Lcol*V}}$$

In the formula above c is the sound speed (m), Scol is a cross sectional area of the neck region 682 (m$^2$), Lcol is a length of the neck region 682 (m), V is a volume of the body region 684 (m$^3$), and f is frequency (Hz). A specified length (Lcorrected) of the neck region 682 may be calculated to target a predetermined frequency according to the following formula:

$$L\text{ corrected} = Lcol + 0.48*\sqrt{Scol}$$

Figure 23:
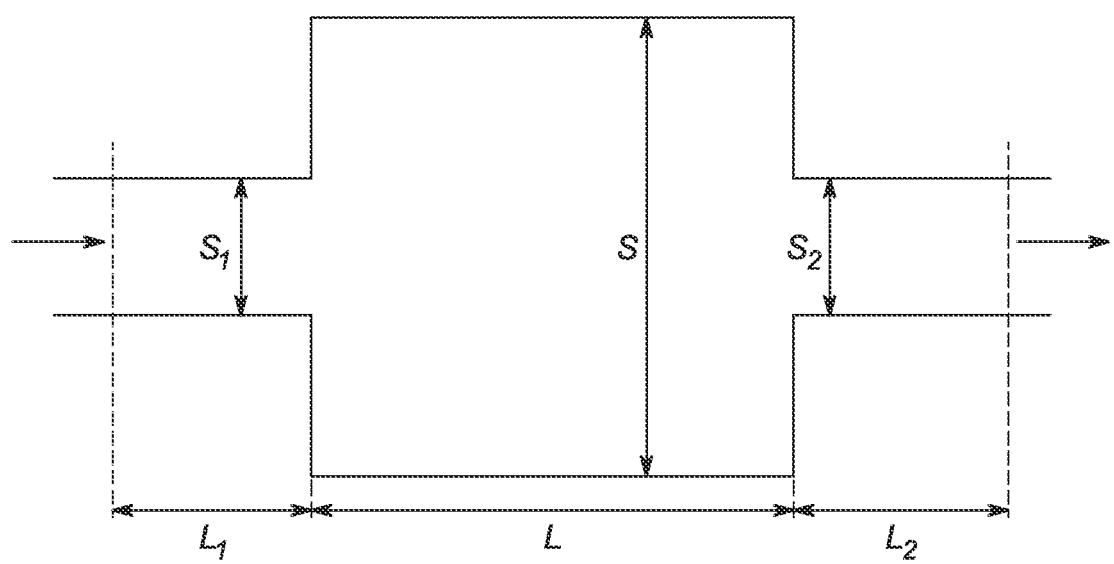
FIG. 23 is a simplified schematic diagram of an expansion chamber, the effects of which are provided by the grilles of FIGS. 14-22.

A simplified schematic view of an expansion chamber is shown in FIG. 23. The shape of the grilles 518, 618 provide similar volumetric changes to those shown in the simplified schematic of FIG. 23. Accordingly, in some embodiments, the expansion chamber effect may be realized by the following formulas with reference to the schematic of FIG. 23:

$$TL = 10*\log_{10}\left(1 + 0.25*\left(\frac{m-1}{m}\right)^2\right)*\left(\sin\left(\frac{2*\pi*f}{c*Leff}\right)^2\right)$$

$$Leff = L + \frac{H}{2}*\left(1.7 - \left(\frac{0.7}{e^m}\right)\right)$$

In the formulas above, TL is noise transmission loss, m is a ratio of the surfaces (S1$^2$/S2$^2$), c is celerity (m/s), f is frequency (Hz), H is a height of the expansion chamber (S), and L is a length of the expansion chamber (m).

It should be noted that the various components and features described above can be combined in a variety of ways, so as to provide other non-illustrated embodiments within the scope of the disclosure. As such, it is to be understood that the disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation.

Although the present disclosure has been described in the foregoing description by way of illustrative embodiments thereof, these embodiments can be modified at will, without departing from the spirit, scope, and nature of the subject disclosed.

We claim:

1. A ventilation assembly comprising:
    a main housing defining an inlet through which air can be received into the main housing and defining an outlet;
    a blower in the main housing and operable to generate a flow of air;
    a partition plate arranged to lie within the main housing; and
    a grille configured to be located adjacent to the main housing inlet,
    wherein at least one of the partition plate and the grille has a plurality of acoustic bodies arranged radially around the inlet and configured to reduce sound produced by the ventilation assembly during operation.

2. The ventilation assembly of claim 1, wherein the plurality of acoustic fixtures are coupled to the grille and are arranged about a grille outlet aperture defined in the grille.

3. The ventilation assembly of claim 2, wherein the grille includes a dome-shaped panel and each of the acoustic features is coupled to a concave, upper surface of the dome-shaped panel.

4. The ventilation assembly of claim 3, wherein the grille includes a plurality of inner acoustic bodies and a plurality of outer acoustic bodies radially spaced from the plurality of inner acoustic bodies.

5. The ventilation assembly of claim 4, wherein the inner acoustic bodies have a first cross sectional area and the outer acoustic bodies have a second cross sectional area greater than the first cross sectional area.

6. The ventilation assembly of claim 4, wherein the outer perimeter of each of the acoustic bodies defines a radial length, and at least one outer acoustic body and at least one inner acoustic body have equal radial lengths.

7. The ventilation assembly of claim 1, wherein the partition plate has an upper surface and a bottom surface and each of the acoustic bodies are formed on the bottom surface of the partition plate and extend downwardly toward the grille.

8. The ventilation assembly of claim 7, wherein the acoustic bodies are arranged annularly about an inlet formed in the partition plate.

9. The ventilation assembly of claim 8, wherein the acoustic bodies includes a plurality of outer acoustic bodies and a plurality of inner acoustic bodies staggered with each of the outer acoustic bodies.

10. The ventilation assembly of claim 8, wherein the acoustic bodies includes a plurality of outer acoustic bodies, a plurality of middle acoustic bodies, and a plurality of inner acoustic bodies, and wherein the middle acoustic bodies are staggered with each of the outer and inner acoustic bodies.

11. The ventilation assembly of claim 10, wherein outer acoustic bodies are not arranged annularly about the inlet.

12. The ventilation assembly of claim 11, wherein the middle acoustic bodies are not arranged annularly about the inlet.

13. The ventilation assembly of claim 1, wherein at least one of the acoustic bodies is formed to include a resonator.

14. The ventilation assembly of claim 13, wherein the resonator includes a neck region that opens toward a central axis of the blower and a body region coupled to the neck region and located radially outward from the neck region.

15. The ventilation assembly of claim 14, wherein the acoustic bodies include a plurality of inner acoustic bodies and a plurality of outer acoustic bodies and each of the outer acoustic bodies includes a resonator while the inner acoustic bodies do not include a resonator.

16. A ventilation assembly comprising:
    a main housing defining an inlet through which air can be received into the main housing and defining an outlet;

a blower situated in the main housing and operable to generate a flow of air;

a scroll housing situated within the main housing and configured to contain the blower, the scroll housing including a side wall and a bottom wall coupled to a lower end of the side wall; and a grille configured to be located adjacent to the inlet of the main housing, wherein the scroll housing includes a plurality of acoustic bodies arranged about the an inlet to the scroll housing.

17. The ventilation assembly of claim 16, wherein the acoustic bodies are formed on the bottom wall of the scroll housing and extend downwardly toward the grille.

18. The ventilation assembly of claim 16, wherein the acoustic bodies include a plurality of inner acoustic bodies and a plurality of outer acoustic bodies spaced radially from the inner acoustic bodies.

19. The ventilation assembly of claim 16, wherein at least one of the acoustic bodies is formed to include a resonator.

20. The ventilation assembly of claim 19, wherein the resonator includes a neck region that opens toward a central axis of the blower and a body region coupled to the neck region and located radially outward from the neck region.

* * * * *